US012779636B2

(12) United States Patent
Aoyama et al.

(10) Patent No.: US 12,779,636 B2
(45) Date of Patent: Nov. 3, 2026

(54) IMPACT TOOL

(71) Applicant: MAKITA CORPORATION, Anjo (JP)

(72) Inventors: Tomoro Aoyama, Anjo (JP); Kazunori Kinoshita, Anjo (JP)

(73) Assignee: MAKITA CORPORATION, Anjo (JP)

( * ) Notice: Subject to any disclaimer, the term of this patent is extended or adjusted under 35 U.S.C. 154(b) by 0 days.

(21) Appl. No.: 19/292,439

(22) Filed: Aug. 6, 2025

(65) Prior Publication Data

US 2026/0225210 A1 Aug. 6, 2026

Related U.S. Application Data

(62) Division of application No. 18/051,613, filed on Nov. 1, 2022, now Pat. No. 12,427,632.

(30) Foreign Application Priority Data

Nov. 29, 2021 (JP) ................................ 2021-193571

(51) Int. Cl.

*B25B 21/02* (2006.01)
*B25B 23/147* (2006.01)
*B25F 5/00* (2006.01)

(52) U.S. Cl.

CPC .......... *B25B 21/02* (2013.01); *B25B 23/1475* (2013.01); *B25F 5/001* (2013.01)

(58) Field of Classification Search

CPC ...... B25B 21/02; B25B 23/1475; B25F 5/001
See application file for complete search history.

(56) References Cited

U.S. PATENT DOCUMENTS

| | | | |
|---|---|---|---|
| 5,816,121 | A | 10/1998 | Yoshimizu et al. |
| 7,719,230 | B2 | 5/2010 | Griffin |
| 2005/0121209 | A1 | 6/2005 | Shimizu et al. |
| 2008/0025017 | A1 | 1/2008 | Tadokoro et al. |
| 2009/0108806 | A1 | 4/2009 | Takano et al. |

(Continued)

FOREIGN PATENT DOCUMENTS

| | | | |
|---|---|---|---|
| DE | 202015007649 | U1 | 12/2015 |
| DE | 102013021202 | B4 | 3/2023 |

(Continued)

OTHER PUBLICATIONS

Office Action from the Japanese Patent Office dispatched May 27, 2025 in related Japanese application No. 2021-193571, and translation thereof.

*Primary Examiner* — Eyamindae C Jallow
(74) *Attorney, Agent, or Firm* — J-TEK LAW PLLC; Jeffrey D. Tekanic; Scott T. Wakeman

(57) ABSTRACT

An impact tool (1) includes: a motor (4); a spindle (6), which is disposed forward of the motor and is rotated by the motor; a hammer (33), which is supported by the spindle; an anvil (8), which is impacted in a rotational direction by the hammer; a motor housing (14), which houses the motor; a grip housing (15), which extends downward from the motor housing; and a battery-holding housing (16), which is disposed at a lower-end portion of the grip housing and holds a battery pack (43) having a rated voltage of 18 V. The distance (Da) between a rearward-most edge of the motor housing and a frontward-most edge of the anvil is 97 mm or less.

19 Claims, 9 Drawing Sheets

(56) References Cited

U.S. PATENT DOCUMENTS

| | | | | |
|---|---|---|---|---|
| 2011/0171887 | A1 | 7/2011 | Tanimoto et al. | |
| 2011/0180286 | A1 | 7/2011 | Oomori et al. | |
| 2012/0037385 | A1 | 2/2012 | Suzuki et al. | |
| 2012/0085560 | A1 | 4/2012 | Kuroyanagi et al. | |
| 2012/0194023 | A1 | 8/2012 | Lau et al. | |
| 2013/0112445 | A1 | 5/2013 | Drako | |
| 2014/0131059 | A1 | 5/2014 | Verbrugge et al. | |
| 2014/0182869 | A1 | 7/2014 | Kumagai et al. | |
| 2014/0318822 | A1 | 10/2014 | Ullrich et al. | |
| 2015/0303417 | A1 | 10/2015 | Koeder et al. | |
| 2017/0326720 | A1 | 11/2017 | Kuroyanagi et al. | |
| 2021/0187707 | A1 | 6/2021 | Smith et al. | |
| 2022/0040829 | A1* | 2/2022 | Schneider | B25B 21/02 |
| 2022/0388134 | A1* | 12/2022 | Hozumi | B25B 23/18 |
| 2023/0166387 | A1* | 6/2023 | Aoyama | B25B 21/02<br>173/93 |

FOREIGN PATENT DOCUMENTS

| | | | | | |
|---|---|---|---|---|---|
| JP | 2017202562 | A | | 11/2017 | |
| WO | WO-2025049875 | A1 | * | 3/2025 | B25B 23/1475 |

* cited by examiner

| | Axial Length [mm] | Maximum Tightening Torque [Nm] |
|---|---|---|
| Company "A" | 114 | 180 |
| Company "B" | 100.8 | 206 |
| Company "C" | 116.6 | 226 |
| Company "D" | 127 | 177 |
| Company "E" | 109 | 165 |
| Company "F" | 98 | 155 |
| Company "G" | 99.4 | 165 |

PRIOR ART

IMPACT TOOL

CROSS-REFERENCE

This application claims priority to Japanese Patent Application No. 2021-filed on Nov. 29, 2021, the contents of which are incorporated herein by reference.

TECHNICAL FIELD

The techniques disclosed in the present specification relate to an impact tool such as an impact driver and an impact wrench.

BACKGROUND ART

A known impact driver as disclosed in US 2017/0326720.

SUMMARY OF THE INVENTION

It is one non-limiting object of the present teachings to disclose techniques for improving the work efficiency and/or ergonomics of an impact tool.

In one non-limiting aspect of the present teachings, an impact tool may comprise a motor, a spindle, a hammer, and an anvil. The spindle may be disposed forward of the motor. The spindle may be rotated by the motor. The hammer may be supported by the spindle. The anvil may be impacted in a rotational direction by the hammer. In addition, the impact tool may comprise a motor housing, which houses the motor. The impact tool may comprise a grip housing, which extends downward from the motor housing. The impact tool may comprise a battery-holding housing, which is disposed at a lower-end portion of the grip housing. The battery-holding housing may hold a battery pack. The rated voltage of the battery pack may be 18 V. The distance between a rear-end portion of the motor housing and a front-end portion of the anvil may be 97 mm or less.

By utilizing techniques disclosed in the present specification, the work efficiency and/or ergonomics of an impact tool can be improved.

DETAILED DESCRIPTION OF THE INVENTION

Figure 1:
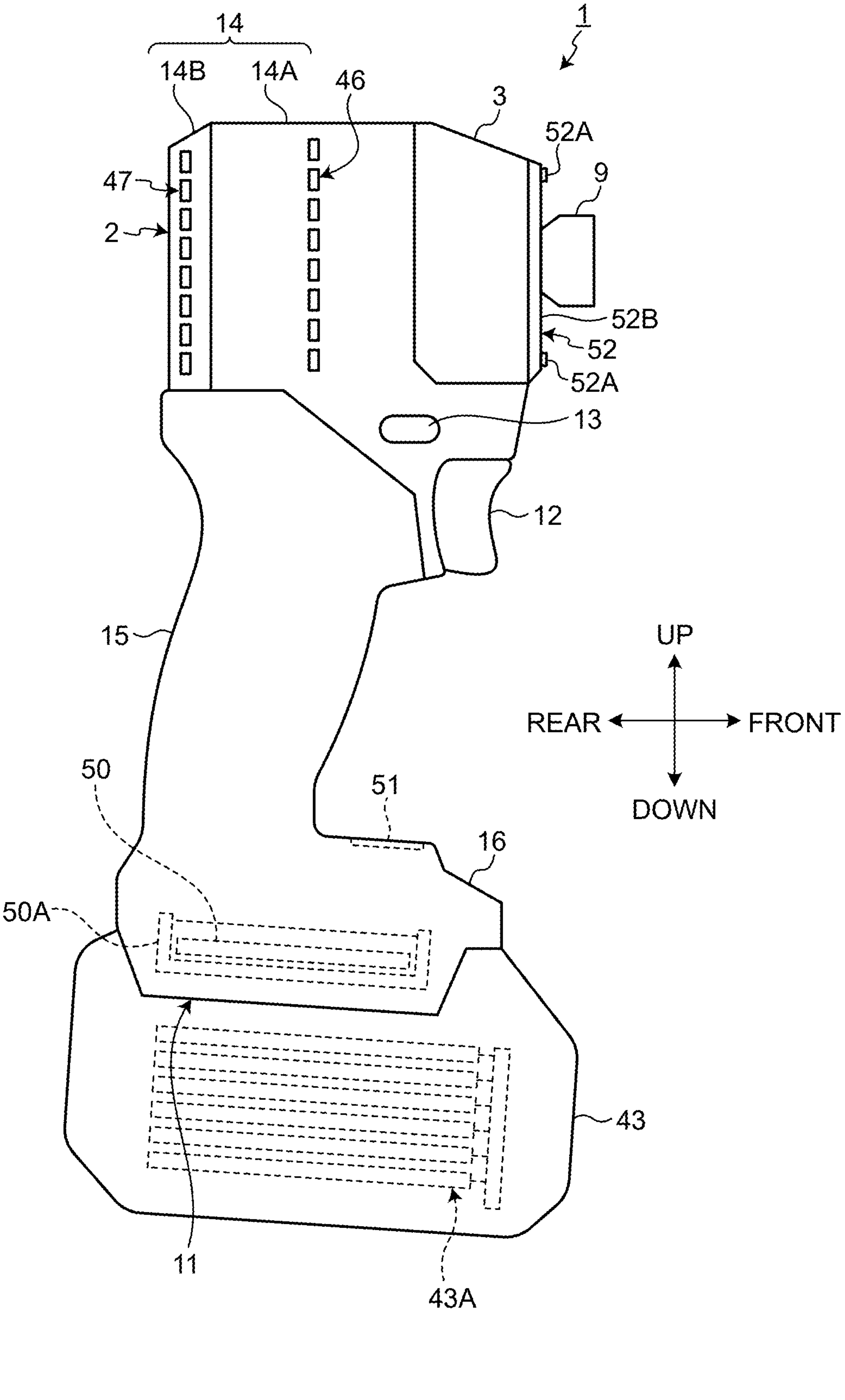
FIG. 1 is a side view that schematically shows an impact driver according to one representative, non-limiting embodiment of the present teachings.

As was mentioned above, an impact tool may comprise a motor, a spindle, a hammer, and an anvil. The spindle may be disposed forward of the motor. The spindle may be rotated by the motor. The hammer may be supported by the spindle. The anvil may be impacted in a rotational direction by the hammer. In addition, the impact tool may comprise a motor housing, which houses the motor. The impact tool may comprise a grip housing, which extends downward from the motor housing. The impact tool may comprise a battery-holding housing, which is disposed at a lower-end portion of the grip housing. The battery-holding housing may hold a battery pack. The rated voltage of the battery pack may be 18 V.

In one or more embodiments, the distance between a rear-end portion of the motor housing and a front-end portion of the anvil may be 97 mm or less.

According to the above-mentioned configuration, because the axial length, which is defined as the distance between a rear-end portion of the motor housing and a front-end portion of the anvil, is 97 mm or less, a shortening of the axial length of the impact tool is achieved. Consequently, the work efficiency and/or ergonomics of an impact tool can be improved.

In one or more embodiments, the distance between a rear-end portion of the motor housing and a front-end portion of the anvil may be 125 mm or less. The maximum tightening torque of the anvil may be 230 N·m or more.

According to the above-mentioned configuration, because the axial length, which is defined as the distance between a rear-end portion of the motor housing and a front-end portion of the anvil, is 125 mm or less and the maximum tightening torque of anvil is 230 N·m or more, a combination of a shortening of the axial length and an increase in the maximum tightening torque is achieved. Consequently, the work efficiency and/or ergonomics of an impact tool can be improved.

In one or more embodiments, when the distance between a rear-end portion of the motor housing and a front-end portion of the anvil is given as Da and the maximum tightening torque of the anvil is given as Tr, the following condition may be satisfied:

$$Tr \geq 1.27 \times Da + 79.$$

According to the above-mentioned configuration, a combination of a shortening of the axial length and an increase in the maximum tightening torque is achieved. Consequently, the work efficiency and/or ergonomics of an impact tool can be improved.

In one or more embodiments, when the distance between a rear-end portion of the motor housing and a front-end portion of the anvil is given as Da and the maximum tightening torque of the anvil is given as Tr, the following conditions may be satisfied:

$$Tr \geq 10.6 \times Da - 860; \text{ and}$$

$$Tr \geq 0.$$

According to the above-mentioned configuration, a combination of a shortening of the axial length and an increase in the maximum tightening torque is achieved. Consequently, the work efficiency and/or ergonomics of an impact tool can be improved.

In one or more embodiments, the motor may comprise the rotor, which is coupled to the spindle and rotates about the rotational axis, and the stator, which is disposed around the rotor. The stator may comprise the stator core and the coils, which are mounted on the teeth of the stator core. When the length of the hammer is given as Dc and the length of the stator core is given as De, the following conditions may be satisfied:

$$15 \text{ mm} \leq Dc \leq 40 \text{ mm; and}$$

$$15 \text{ mm} \leq De \leq 40 \text{ mm.}$$

According to the above-mentioned configuration, the impact tool is provided in which the balance between the length of the hammer and the length of the stator core is improved, and thereby the work efficiency and/or ergonomics of an impact tool can be improved.

In one or more embodiments, the motor may comprise the rotor, which is (operably) coupled to the spindle and is configured to be rotated about the rotational axis, and the stator, which is disposed around the rotor. The stator may comprise the stator core and the coils, which are respectively mounted on (wound around) the teeth of the stator core. When the length of the stator core is given as De and the diameter of the stator core is given as Dk, the following conditions may be satisfied:

length De is 3 mm or more and 15 mm or less; and the ratio (De:Dk) is 1:3 or more and 10 or less.

According to the above-mentioned configuration, the impact tool is provided in which the balance between the length of the stator core and the diameter of the stator core is improved, and thereby the work efficiency and/or ergonomics of an impact tool can be improved.

In one or more embodiments, the motor may comprise the rotor, which is (operably) coupled to the spindle and is configured to be rotated about the rotational axis, and the stator, which is disposed around the rotor. The stator may comprise the stator core and the coils, which are respectively mounted on (wound around) the teeth of the stator core. When the axial length, which is defined as the distance between a rear-end portion of the motor housing and a front-end portion of the anvil, is given as Da, the length of the hammer is given as Dc, and the length of the stator core is given as De, the following conditions may be satisfied:

(Dc+De)/Da is 20% or more and 60% or less; and axial length Da is 80 mm or more and 120 mm or less.

According to the above-mentioned configuration, the impact tool is provided in which the balance among the axial length, the length of the hammer, and the length of the stator core is improved, and thereby the work efficiency and/or ergonomics of an impact tool can be improved.

In one or more embodiments, the weight of the impact tool is preferably 0.7 kg or more and 1.4 kg or less and the maximum tightening torque of the anvil is preferably 150 N·m or more and 250 N·m or less.

According to the above-mentioned configuration, an impact tool can be configured, which is lightweight while still being capable of outputting a large maximum tightening torque.

A representative, non-limiting embodiment of the present teachings will now be explained in greater detail, with reference to the drawings. In the embodiment, positional relationships among parts will be explained using the terms left, right, front, rear, up, and down. Each of these terms indicates a relative position or a direction, using the center of an impact driver 1 as a reference. The impact driver 1 comprises a motor 4, which serves as the motive-power source.

In the embodiment, a direction parallel to rotational axis AX of the motor 4 is called the axial direction where appropriate, a direction that goes around rotational axis AX is called the circumferential direction or the rotational direction where appropriate, and a radial direction of rotational axis AX is called the radial direction where appropriate.

Rotational axis AX extends in a front-rear direction. One side in the axial direction is forward, and the other side in the axial direction is rearward. In addition, in the radial direction, a location that is proximate to or a direction that approaches rotational axis AX is called radially inward where appropriate, and a location that is distant from or a direction that leads away from rotational axis AX is called radially outward where appropriate.

Impact Tool

Figure 2:
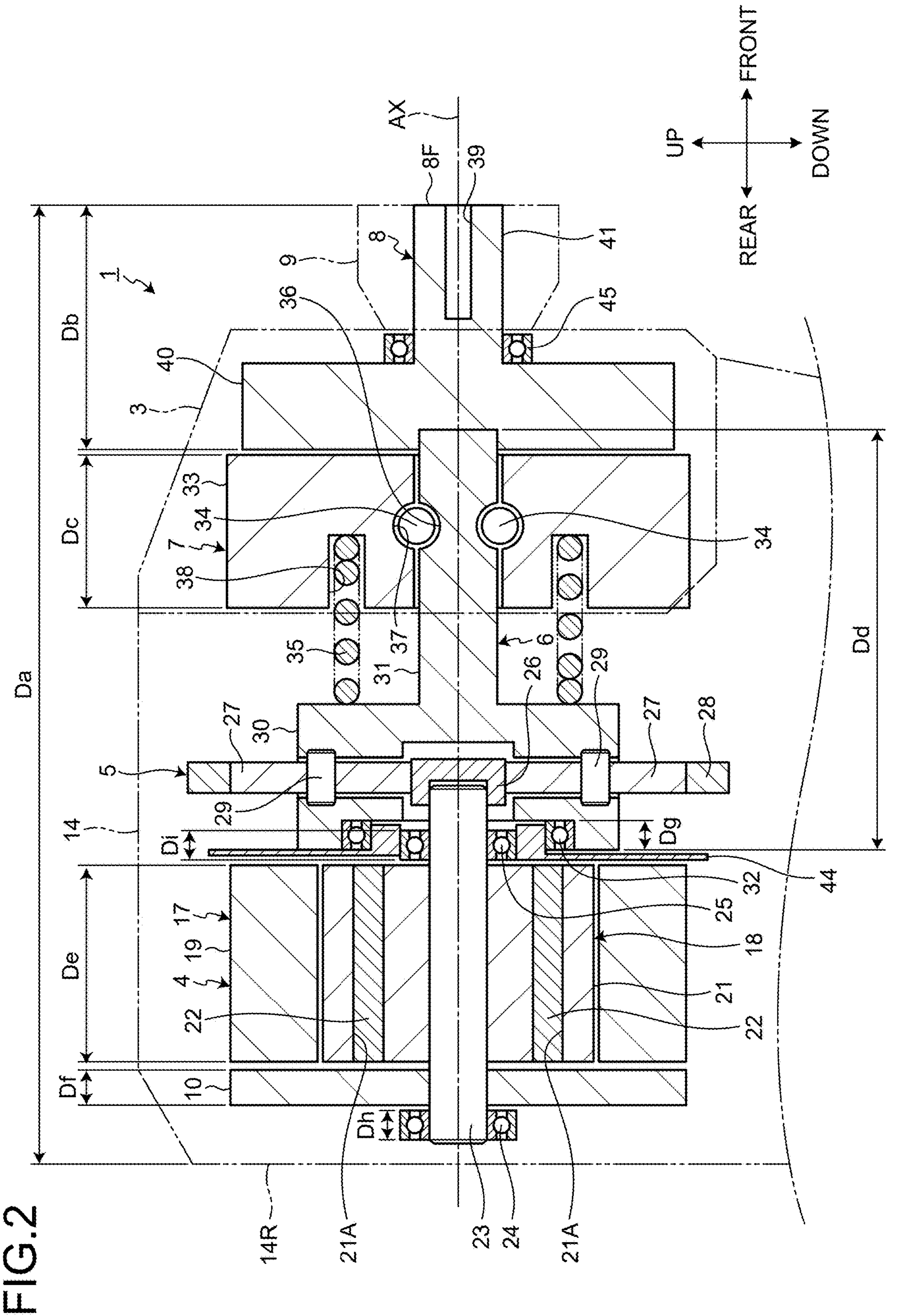
FIG. 2 is a cross-sectional view that schematically shows an upper portion of the impact driver according to the embodiment.

FIG. 1 is a side view that schematically shows the impact driver 1, which is one example of an impact tool, according to the exemplary embodiment. FIG. 2 is a cross-sectional view that schematically shows an upper portion of the impact driver 1. The impact driver 1 is a power tool for tightening screws, etc.

The impact driver 1 comprises a housing 2, a hammer case 3, the motor 4, a speed-reducing mechanism 5, a spindle 6, an impact mechanism 7, an anvil 8, a tool-holding mechanism 9, a fan 10, a controller 50, a battery-mounting part 11, a trigger lever 12, a forward/reverse change lever 13, an operation panel 51, and a light assembly 52.

The housing 2 comprises a motor housing 14, a grip housing 15, and a battery-holding housing 16. The housing 2 is made of a synthetic resin (polymer).

The motor housing 14 houses the motor 4. The grip housing 15 extends downward from the motor housing 14. The grip housing 15 is configured to be gripped by a user during operation of the impact driver 1. The battery-holding housing 16 is disposed at a lower-end portion of the grip housing 15. In both the front-rear direction and the left-right direction, the dimension of the outer shape of the motor housing 14 is larger than the dimension of the outer shape of the grip housing 15. In both the front-rear direction and the left-right direction, the dimension of the outer shape of the battery-holding housing 16 is larger than the dimension of the outer shape of the grip housing 15.

It is noted that the housing 2 may comprise a plurality of members combined with each other. The housing 2 may be, for example, a split-in-half structure in which a left housing half and a right housing half are connected to each other. In the embodiment, the motor housing 14 comprises a tubular part 14A, which is disposed around the motor 4, and a rear-cover part 14B, which covers an opening in (at) a rear-end portion of the tubular part 14A.

The hammer case 3 is made of metal. The hammer case 3 has a tube shape. The hammer case 3 is connected to a front portion of the motor housing 14. The hammer case 3 houses at least a portion of the impact mechanism 7 and at least a portion of the anvil 8.

The motor 4 is the motive-power source of the impact driver 1. The motor 4 is an inner-rotor-type brushless motor. The motor 4 comprises a stator 17 and a rotor 18. The stator 17 is supported by the motor housing 14. At least a portion of the rotor 18 is disposed inward (in the interior) of the stator 17. The rotor 18 rotates relative to the stator 17. The rotor 18 rotates about rotational axis AX.

Figure 3:
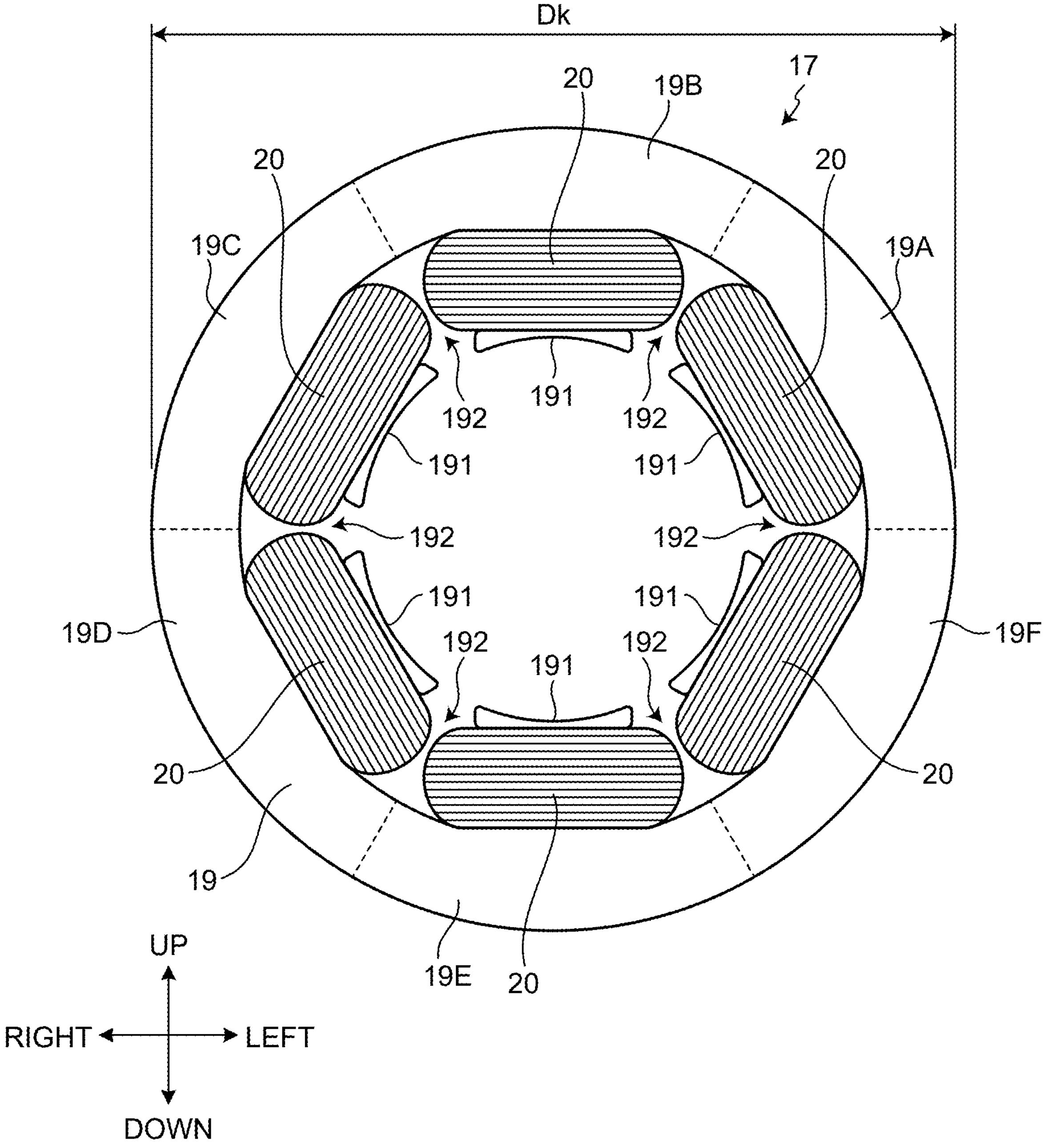
FIG. 3 schematically shows a stator according to the embodiment.

FIG. 3 schematically shows the stator 17 according to the embodiment. FIG. 3 corresponds to a drawing of the stator 17 viewed from the front. The stator 17 comprises a stator core 19 and coils 20. The stator core 19 is disposed radially outward of the rotor 18. The stator core 19 is made of a plurality of steel laminations. The stator core 19 has a tube shape. The coils 20 are mounted on teeth 191 of the stator core 19 via an insulator (not shown). Slots 192 are provided such that each of the slots 192 is disposed between a pair of the teeth 191 that are adjacent to each other. At least a portion of each of the coils 20 is disposed in the corresponding slots 192. The stator core 19 and the coils 20 are electrically insulated from each other by the insulator.

In the embodiment, six of the teeth 191 (i.e. six slots 192) are provided. Six of the coils 20 are provided. That is, in the embodiment, the stator 17 is a 6-slot/6-coil type stator.

It is noted that the stator core 19 may comprise a plurality of stator-core segments. In an embodiment in which the stator 17 is a 6-slot/6-coil type stator, the stator core 19 is constituted by six stator-core segments 19A, 19B, 19C, 19D, 19E, 19F, as shown in FIG. 3.

Referring back to FIG. 2, the rotor 18 rotates about rotational axis AX. The rotor 18 comprises a rotor core 21, rotor magnets 22, and a rotor shaft 23. The rotor core 21 and the rotor shaft 23 are each made of steel. A rear portion of the rotor shaft 23 protrudes rearward from a rear-end surface of the rotor core 21. A front portion of the rotor shaft 23 protrudes forward from a front-end surface of the rotor core 21. In the state in which the rotor magnets 22 have been inserted into through holes 21A of the rotor core 21, the rotor magnets 22 are fixed to the rotor core 21. In the embodiment, four of the rotor magnets 22 are provided in the rotor core 21. It is noted that eight of the rotor magnets 22 may be provided in the rotor core 21.

It is noted that, in an embodiment in which the stator 17 is a 9-slot/9-coil type stator, six of the rotor magnets 22 may be provided in the rotor core 21.

The rotor shaft 23 is supported in a rotatable manner by a rotor-rear-portion bearing 24 and a rotor-front-portion bearing 25. The rotor-rear-portion bearing 24 supports, in a rotatable manner, a rear portion of the rotor shaft 23. The rotor-front-portion bearing 25 supports, in a rotatable manner, a front portion of the rotor shaft 23. The rotor-rear-portion bearing 24 is held by, for example, a portion of the motor housing 14. The rotor-front-portion bearing 25 is retained by a bearing-retaining member 44. The bearing-retaining member 44 is held by the hammer case 3 and the motor housing 14.

The speed-reducing mechanism 5 transmits the rotation of the rotor 18 to the spindle 6. The speed-reducing mechanism 5 operably couples the rotor shaft 23 and the spindle 6 to each other. The speed-reducing mechanism 5 causes the spindle 6 to rotate at a rotational speed that is lower than the rotational speed of the rotor shaft 23, but with higher torque. The speed-reducing mechanism 5 comprises a planetary-gear mechanism. The speed-reducing mechanism 5 is disposed forward of the stator core 19.

The speed-reducing mechanism 5 comprises: a pinion gear 26, which is fixed to a front-end portion of the rotor shaft 23; a plurality of planet gears 27 disposed around the pinion gear 26; and an internal gear 28 disposed around the plurality of planet gears 27. Each of the planet gears 27 meshes with the pinion gear 26. The planet gears 27 are respectively supported on pins 29 so as to be rotatable relative to the spindle 6. The spindle 6 is rotated by the revolving (orbiting) of the planet gears 27 around the pinion gear 26. The internal gear 28 has inner teeth, which mesh with the planet gears 27. The internal gear 28 is fixed to the motor housing 14 and the hammer case 3 so as to be non-rotatable relative thereto.

When the rotor shaft 23 rotates in response to energization (operation) of the motor 4, the pinion gear 26 rotates, and thus the planet gears 27 will revolve around the pinion gear 26. More specifically, the planet gears 27 revolve because the planet gears 27 also mesh with the radially-inward-projecting teeth of the internal gear 28. In response to the revolving of the planet gears 27, the spindle 6, which is connected to the planet gears 27 via the pins 29, rotates at a rotational speed that is lower than the rotational speed of the rotor shaft 23.

The spindle 6 is disposed forward of the motor 4. The spindle 6 is rotated by the motor 4. At least a portion of the spindle 6 is disposed forward of the speed-reducing mechanism 5. The spindle 6 is disposed rearward of the anvil 8. The spindle 6 rotates owing to the rotational force of the rotor 18, which is transmitted by the speed-reducing mechanism 5. The spindle 6 transmits the rotational force of the motor 4 to the anvil 8.

The spindle 6 comprises: a flange part 30; and a spindle-shaft part 31, which protrudes forward from the flange part 30. The planet gears 27 are supported in a rotatable manner by the flange part 30 via the respective pins 29. The spindle 6 rotates about rotational axis AX. The spindle 6 is supported in a rotatable manner by a spindle-rear-portion bearing 32. A recessed portion is provided at (in) a rear portion of the flange part 30. The spindle-rear-portion bearing 32 is disposed in the interior of the recessed portion. The spindle-rear-portion bearing 32 is retained by the bearing-retaining member 44.

The impact mechanism 7 is driven by the motor 4. The rotational force of the motor 4 is transmitted to the impact mechanism 7 via the speed-reducing mechanism 5 and the spindle 6. The impact mechanism 7 impacts the anvil 8 in the rotational direction based on the rotational force of the spindle 6, which rotates owing to the motor 4. The impact mechanism 7 comprises a hammer 33, balls 34, and a coil spring 35.

The hammer 33 is disposed forward of the speed-reducing mechanism 5. The hammer 33 is disposed around the spindle 6. The hammer 33 is held by the spindle 6. The balls 34 are disposed between the spindle 6 and the hammer 33. The coil spring 35 is supported by both the spindle 6 and the hammer 33.

Figure 4:
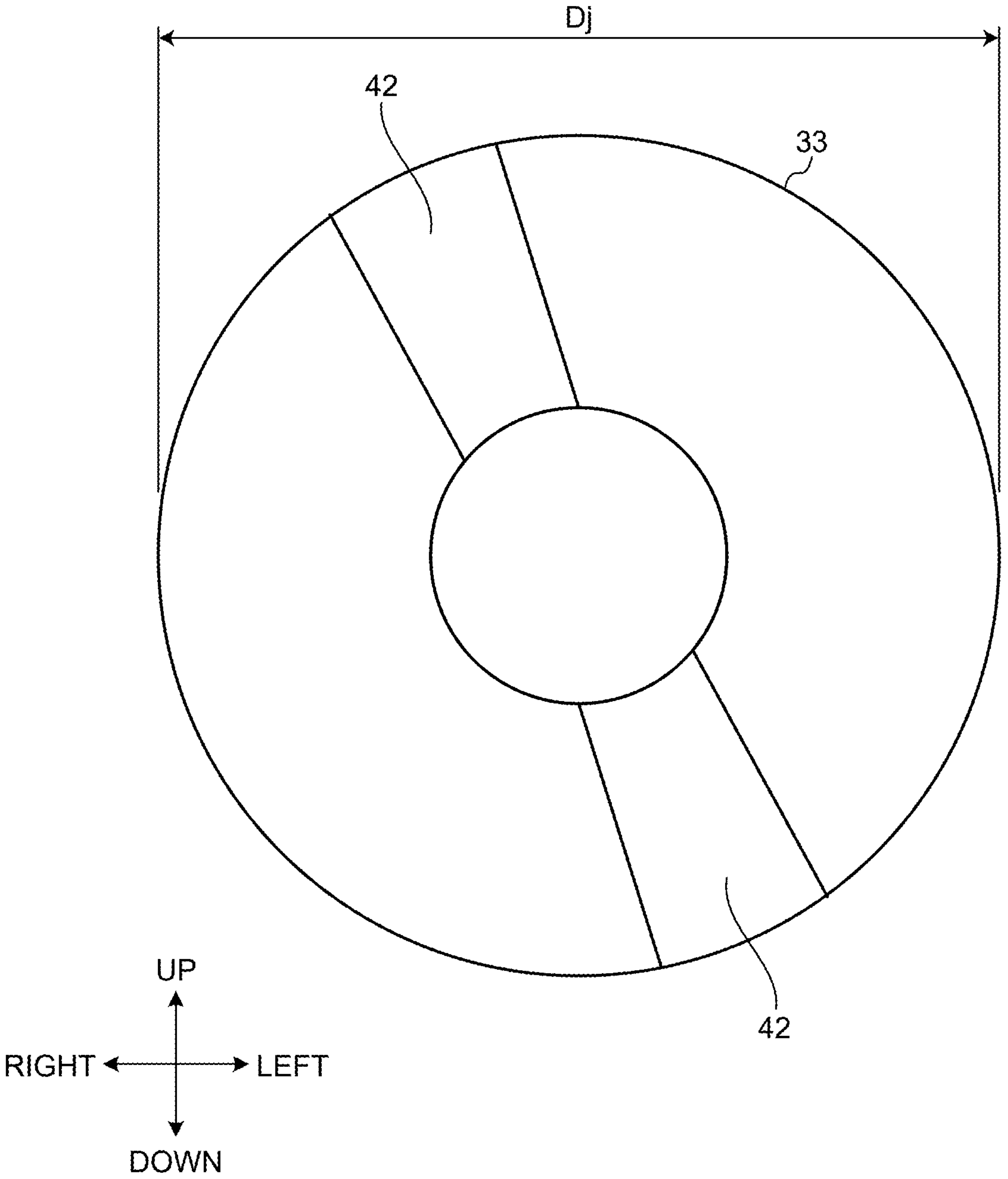
FIG. 4 schematically shows a hammer according to the embodiment.

FIG. 4 schematically shows the hammer 33 according to the embodiment. FIG. 4 corresponds to a drawing of the hammer 33 viewed from the front. The hammer 33 has a tube shape. The hammer 33 is disposed around the spindle-shaft part 31. The hammer 33 is rotated when the motor 4 is energized and the rotor 18 is rotating. More specifically, the rotational force of the motor 4 is transmitted to the hammer 33 via the speed-reducing mechanism 5 and the spindle 6. The hammer 33 is rotatable, together with the spindle 6, due to the rotational force of the spindle 6, which rotates when the motor 4 is energized. The hammer 33 rotates about rotational axis AX.

Each of the balls 34 is made of a metal such as steel. The balls 34 are disposed between the spindle-shaft part 31 and the hammer 33. The spindle-shaft part 31 has a spindle groove 36, in which at least a portion of each of the balls 34 is disposed. The hammer 33 has a hammer groove 37, in which at least a portion of each of the balls 34 is disposed. The balls 34 are disposed between the spindle groove 36 and the hammer groove 37. The balls 34 can revolve in the interior of the spindle groove 36 and the interior of the hammer groove 37. The hammer 33 is capable of moving along with the balls 34. The spindle 6 and the hammer 33 are capable of relative movement in both the axial direction and the rotational direction within a movable range, which is defined by the spindle groove 36 and the hammer groove 37.

The coil spring 35 generates an elastic force (elastic restoring force), which causes (urges, biases) the hammer 33 to move forward. The coil spring 35 is disposed between the flange part 30 and the hammer 33. A rear-end portion of the coil spring 35 is supported by (on) the flange part 30. A front-end portion of the coil spring 35 is disposed in the interior of a recessed part 38, which is provided at (in) a rear portion of the hammer 33. A front-end portion of the coil spring 35 is supported by the hammer 33.

The anvil 8 is the output part of the impact driver 1, which rotates due to the rotational force of the rotor 18. The anvil 8 rotates about rotational axis AX. The anvil 8 is disposed forward of the motor 4. A front-end portion of the spindle-shaft part 31 and a rear-end portion of the anvil 8 are connected to each other. At least a portion of the anvil 8 is disposed forward of the hammer 33. The anvil 8 has a tool hole 39, into which a tool accessory is insertable. The tool hole 39 is provided in a front-end portion of the anvil 8. The tool accessory is thus mountable on (in) the anvil 8.

The anvil 8 comprises anvil-projection parts (anvil projections) 40 and an anvil-shaft part (anvil shaft) 41. The anvil-projection parts 40 are provided at a rear-end portion of the anvil 8. More specifically, the anvil-projection parts 40 protrude radially outward from the rear-end portion of the anvil-shaft part 41 of the anvil 8 in diametrically-opposite directions. The tool hole 39 is provided in a front-end portion of the anvil-shaft part 41. The tool accessory is mountable on (in) the anvil-shaft part 41. The anvil-shaft part 41 is supported in a rotatable manner by an anvil bearing 45. The anvil bearing 45 is held by the hammer case 3.

At least a portion of the hammer 33 is capable of making contact with the anvil-projection parts 40. Hammer-projection parts 42, which protrude forward, are provided at a front portion of the hammer 33. The hammer-projection parts 42 and the anvil-projection parts 40 are capable of making (configured to) contact with one another. When the hammer-projection parts 42 and the anvil-projection parts 40 are respectively in contact with one another, the anvil 8 rotates together with the hammer 33 and the spindle 6 when the motor 4 is being energized.

The anvil 8 is impacted in the rotational direction by the hammer 33. For example, during screw-tightening work, there are situations in which, when the load that acts on the anvil 8 becomes high, the anvil 8 can no longer be caused to rotate merely by the power (rotational force) generated by the motor 4. When the anvil 8 can no longer be caused to rotate merely by the power generated by the motor 4, the rotation of the anvil 8 and the hammer 33 will temporarily (momentarily) stop. The spindle 6 and the hammer 33 can move relative to one another in the axial direction and the circumferential direction via the balls 34. Even if the rotation of the hammer 33 temporarily stops, the rotation of the spindle 6 continues owing to the power generated by the motor 4. In the state in which the rotation of the hammer 33 has temporarily stopped but the spindle 6 continues to rotate, the balls 34 move rearward while being guided by the spindle groove 36 and the hammer groove 37. The hammer 33 receives a force from the balls 34 and moves rearward along with the balls 34. That is, while the rotation of the anvil 8 is temporarily stopped, the hammer 33 moves rearward owing to the rotation of the spindle 6. The contact between the hammer 33 and the anvil-projection part 40 is released by the movement of the hammer 33 rearward.

As was mentioned above, the coil spring 35 generates an elastic restoring force, which causes the hammer 33 to move forward. The hammer 33, which has moved rearward, moves forward owing to the elastic restoring force of the coil spring 35. When the hammer 33 moves forward, it receives a force in the rotational direction from the balls 34. That is, the hammer 33 moves forward while rotating. When the hammer 33 moves forward while rotating, the hammer 33 makes contact with the anvil-projection part 40 while rotating. Thereby, the anvil-projection part 40 is impacted in the rotational direction by the hammer-projection part 42 of the hammer 33. Both the power of the motor 4 and the inertial force of the hammer 33 act on the anvil 8. Accordingly, the anvil 8 can rotate about motor rotational axis AX with a high torque.

The tool-holding mechanism (e.g., a tool chuck) 9 is disposed around a front portion of the anvil 8. The tool-holding mechanism 9 is contactable in the front-rear direction. The tool-holding mechanism 9 holds the tool accessory (driver bit), which is inserted into the tool hole 39. The tool-holding mechanism can be changed. For example, an anvil has a cuboid shape at a front portion thereof, and a tool accessory (socket) is connected to a cuboid of the anvil. This type of impact tool is sometimes called an impact wrench. In the present specification, impact drivers and impact wrenches are called impact tools.

The fan 10 is disposed rearward of the stator 17 of the motor 4. The fan 10 generates an airflow for cooling the motor 4. The fan 10 is fixed to a rear portion of the rotor shaft 23. The fan 10 is disposed between the rotor-rear-portion bearing 24 and the stator 17. The fan 10 rotates together with the rotation of the rotor 18. In other words, when the rotor shaft 23 is rotated, the fan 10 rotates together with the rotor shaft 23. In response to rotation of the fan 10, air from the exterior of the housing 2 flows into the interior space of the housing 2 via air-intake ports 46, which are provided in the motor housing 14. The air that has flowed into the interior space of the housing 2 flows through the interior space of the housing 2, thereby cooling the motor 4. The air that has flowed through the interior space of the housing 2 flows out to the exterior of the housing 2 via air-exhaust ports 47, which are provided in the motor housing 14, due to the rotation of the fan 10. It is noted that the fan 10 may be disposed forward of the stator 17.

The controller 50 is housed in the battery-holding housing 16. The controller 50 controls the motor 4. The controller 50 outputs a control signal to control the motor 4. The controller 50 comprises a printed circuit board (PCB). The printed circuit board comprises a printed wiring board (PWB) and a plurality of electronic parts mounted on the printed wiring board. A microcomputer, capacitors, resistors, and switching devices (e.g., power FETs) are illustrative examples of the electronic parts mounted on the printed wiring board. For example, six of the switching devices are provided. The controller 50 is housed in a controller case 50A. The controller 50 and the controller case 50A are fixed to each other by a synthetic resin (polymer, e.g., a polymer adhesive). The controller case 50A functions as a mold for the synthetic resin, which covers the controller 50.

The battery-mounting part 11 is disposed at a lower portion of the battery-holding housing 16. A battery pack 43 is mounted on the battery-mounting part 11. The battery-holding housing 16 holds the battery pack 43 via the battery-mounting part 11.

In the state in which the battery pack 43 is held by the battery-holding housing 16, a front-end portion of the battery pack 43 is disposed more rearward than a front-end portion 8F of the anvil 8.

In the state in which the battery pack 43 is held by the battery-holding housing 16, the front-end portion of the battery pack 43 is disposed more forward than a front-end portion of the battery-holding housing 16.

The battery pack 43 is detachable from the battery-mounting part 11. The battery pack 43 is mounted on and demounted (removed) from the battery-mounting part 11 by moving (sliding) the battery pack 43 in the front-rear direction relative to the battery-holding housing 16. That is, the mounting/demounting system of the battery pack 43 relative to the battery-mounting part 11 is a slide system wherein the battery pack 43 is mounted on and demounted from the battery-holding housing 16 by being slid substantially in the front-rear direction. The battery pack 43 is mounted on the battery-mounting part 11 by being inserted into the battery-mounting part 11 from forward of the battery-holding housing 16. The battery pack 43 is demounted from the battery-mounting part 11 by being removed forward from the battery-mounting part 11.

The battery pack 43 comprises secondary (rechargeable) batteries 43A. In the embodiment, the battery pack 43 comprises rechargeable lithium-ion batteries. The secondary batteries 43A may be cylindrical cells or may be laminated cells. As shown in FIG. 1, in the embodiment, the secondary batteries 43A are laminated cells. A plurality of the laminated cells may be disposed in the up-down direction. By being mounted on the battery-mounting part 11, the battery pack 43 can supply electric power to the impact driver 1. The motor 4 operates using electric power supplied from the battery pack 43.

The rated voltage of the battery pack 43 is 18 V.

The trigger lever 12 is provided on the grip housing 15. The trigger lever 12 is manipulated (pressed) by the user to start (energize) the motor 4. The motor 4 is changed between operation and stoppage by manipulating (pressing and releasing) the trigger lever 12.

The forward/reverse change lever 13 is provided at an upper portion of the grip housing 15. The forward/reverse change lever 13 is manipulated (pressed) by the user. In response to manipulation of the forward/reverse change lever 13, the rotational direction of the motor 4 is changed from one of the forward-rotational direction and the reverse-rotational direction to the other. When the rotational direction of the motor 4 is changed, the rotational direction of the spindle 6 is changed.

The operation panel 51 is provided on the battery-holding housing 16. One or more buttons or switches on the operation panel 51 is (are) manipulated (pressed) by the user to change the control mode (action mode, application mode) of the motor 4. The control mode of the motor 4 refers to the control method or the control pattern (sequence of varying rotational speeds) of the motor 4. It is noted that the operation panel 51 may comprise a display device that displays the control mode that was set by the user.

The light assembly 52 emits illumination light. The light assembly 52 illuminates the anvil 8 and the periphery of the anvil 8 with illumination light. The light assembly 52 illuminates forward of the anvil 8 with illumination light. In addition, the light assembly 52 illuminates the tool accessory, which is mounted on the anvil 8, and the periphery of the tool accessory with illumination light. In the embodiment, the light assembly 52 comprises a circuit board 52B and a plurality of light-emitting devices 52A mounted on the circuit board 52B. Each of the light-emitting devices 52A comprises a light-emitting diode (LED).

Relationship Between Axial Length and Maximum Tightening Torque

Figures 5, 6:
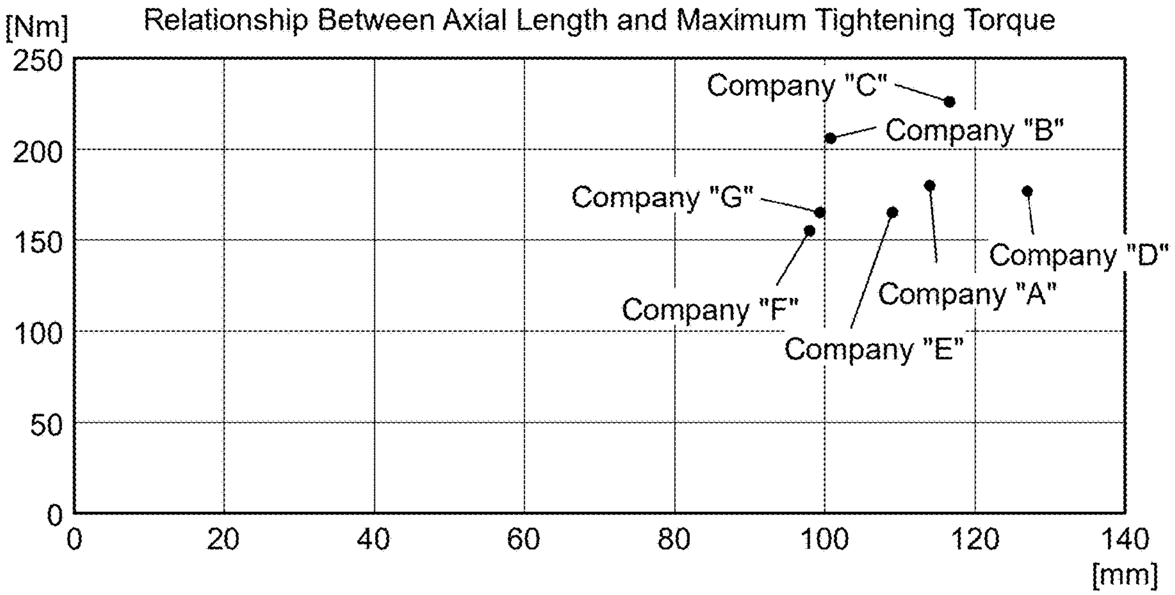
FIG.6 PRIOR ART
FIG. 5 contains a table that shows the relationship between axial length and maximum tightening torque for impact drivers according to well-known art.
FIG. 6 is a graph that shows the relationship between axial length and maximum tightening torque for impact drivers according to well-known art.

FIG. 5 is a table that shows the relationship between axial length and maximum tightening torque for seven commercially-sold (known) impact drivers. FIG. 6 is a graph that shows the relationship between axial length and maximum tightening torque for these seven commercially-sold impact drivers.

FIG. 5 and FIG. 6 each show the relationship between axial length and maximum tightening torque for impact drivers that have been respectively manufactured and sold by company "A," company "B," company "C," company "D," company "E," company "F," and company "G". These impact drivers have structural elements that are equivalent to the structural elements of the impact driver 1, which were explained with reference to FIGS. 1-4. A battery pack is mounted on each of the known impact drivers shown in FIG. 5 and FIG. 6. The rated voltage of the battery pack mounted on each of the known impact drivers shown in FIG. 5 and FIG. 6 is 18 V.

In FIGS. 5 and 6, axial length refers to the distance between a rear-end portion (rearward-most edge) of the motor housing and a front-end portion (frontward-most edge) of the anvil. Maximum tightening torque refers to the torque generated by the anvil during tightening under prescribed conditions.

As shown in FIGS. 5 and 6, the axial length of the impact driver made by company "A" is 114 mm, and the maximum tightening torque is 180 N·m. The axial length of the impact driver made by company "B" is 100.8 mm, and the maximum tightening torque is 206 N·m. The axial length of the impact driver made by company "C" is 116.6 mm, and the maximum tightening torque is 226 N·m. The axial length of the impact driver made by company "D" is 127 mm, and the maximum tightening torque is 177 N·m. The axial length of the impact driver made by company "E" is 109 mm, and the maximum tightening torque is 165 N·m. The axial length of the impact driver made by company "F" is 98 mm, and the maximum tightening torque is 155 N·m. The axial length of the impact driver made by company "G" is 99.4 mm, and the maximum tightening torque is 165 N·m.

To avoid a decrease in work efficiency of an impact driver, it is effective to shorten the overall axial length of the upper portion of the impact driver. However, when the maximum tightening torque is increased, it often leads to a design in which the axial length becomes relatively long. It is important to suitably set the tradeoff between axial length and maximum tightening torque, in order to design a more ergonomic impact driver.

As described above, the impact driver 1 comprises a plurality of structural elements such as the motor 4, the spindle 6, the impact mechanism 7, the anvil 8, the fan 10, the rotor-rear-portion bearing 24, the rotor-front-portion bearing 25, and the spindle-rear-portion bearing 32. The impact driver 1 having a short axial length is provided by adjusting the dimensions, the ratios, and the like of these structural elements.

In the present specification, because the dimensions and the ratios of the plurality of structural elements of the impact driver 1 are optimized, the impact driver 1 has an axial length that is shorter than the axial lengths of the known impact drivers shown in FIGS. 5 and 6.

As shown in FIG. 2, with regard to the impact driver 1 according to the embodiment, axial length Da refers to the distance between a rear-end portion 14R of the motor housing 14 and the front-end portion 8F of the anvil 8.

Figure 7:
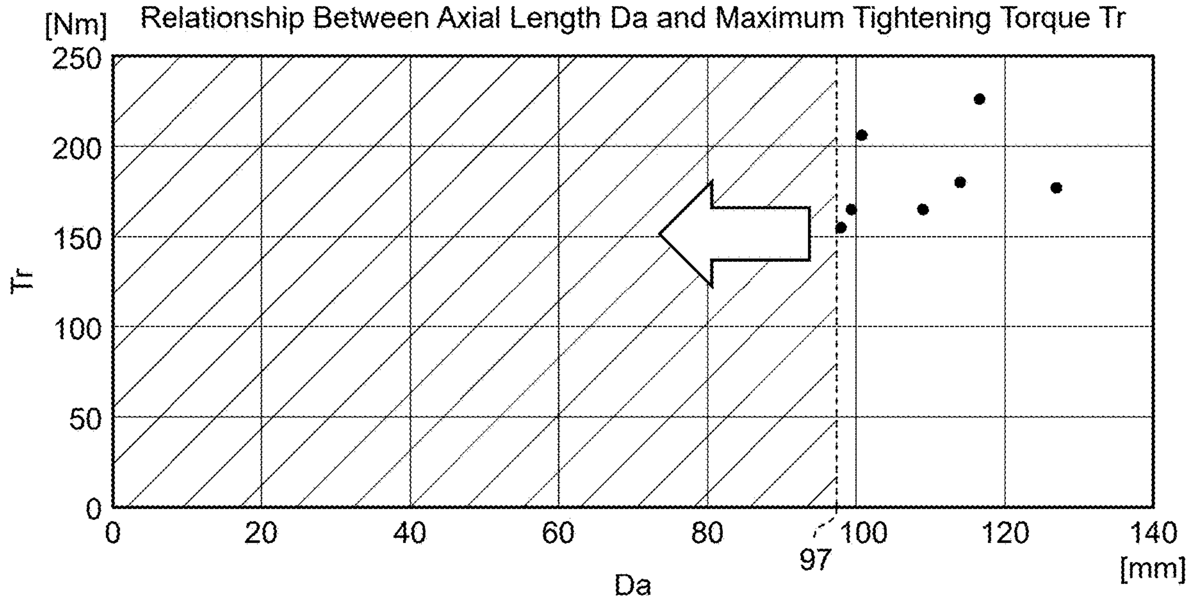
FIG. 7 is a graph that shows the relationship between axial length and maximum tightening torque for the impact driver according to the embodiment.

FIG. 7 is a graph that shows the relationship between axial length Da and maximum tightening torque Tr of the impact driver 1 according to the embodiment. As shown in FIG. 7, with regard to the impact driver 1 according to the embodiment, axial length Da, which is defined as the distance between the rear-end portion (rearward-most edge) 14R of the motor housing 14 and the front-end portion (frontward-most edge) 8F of the anvil 8, is 97 mm or less. Axial length Da of the impact driver 1 according to the embodiment is shorter than the axial length of each of the known impact drivers shown in FIGS. 5 and 6. Consequently, improved work efficiency and/or ergonomics of the impact driver 1 can be achieved. Axial length Da is preferably 97 mm or less, but the value of axial length Da is arbitrary. In addition, the value of maximum tightening torque Tr is also arbitrary.

In addition, to further improve the work efficiency and/or ergonomics of the impact driver, it is effective to achieve the combination of a shortening of axial length Da and an increase in maximum tightening torque Tr.

In some circumstances, maximum tightening torque Tr will depend on, for example, the dimension of the hammer 33. Thus, in such circumstances, the larger the hammer 33, the larger maximum tightening torque Tr becomes. However, if the hammer 33 becomes large, then axial length Da also will become long.

The present specification provides the impact driver 1, in which the dimensions and the ratios of the plurality of structural elements of the impact driver 1 are optimized, and thereby the combination of a shortening of axial length Da and an increase in maximum tightening torque Tr can be achieved.

Figure 8:
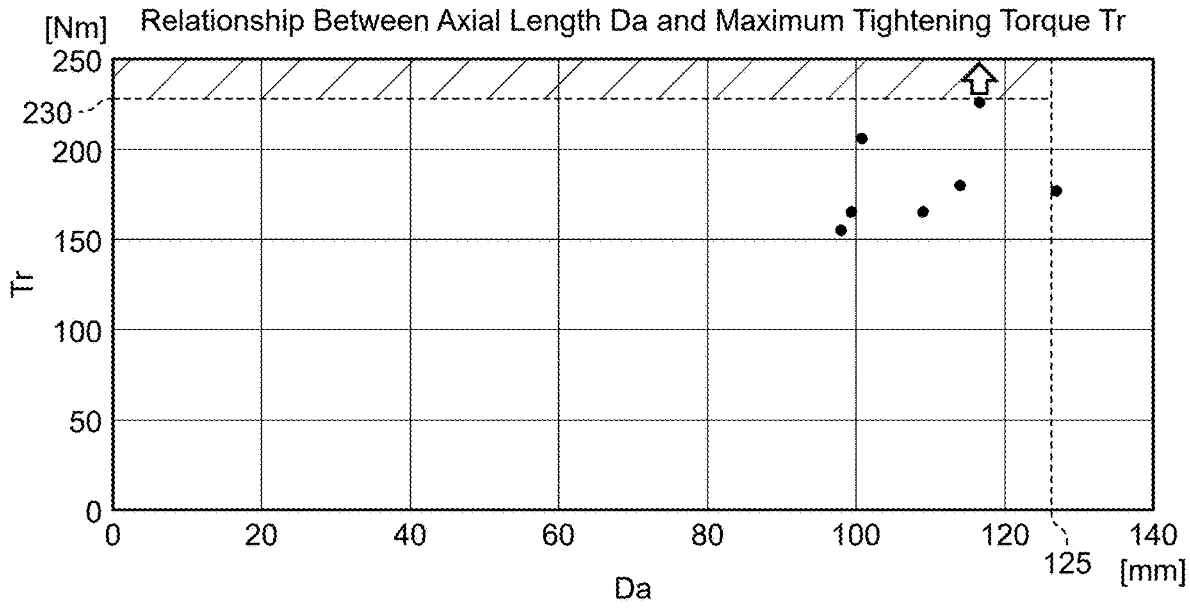
FIG. 8 is a graph that shows the relationship between axial length and maximum tightening torque for the impact driver according to the embodiment.

FIG. 8 is a graph that shows the relationship between axial length Da and maximum tightening torque Tr of the impact driver 1 according to the embodiment. As shown in FIG. 8, regarding the impact driver 1 according to the embodiment, axial length Da, which is defined as the distance between the rear-end portion (rearward-most edge) 14R of the motor housing 14 and the front-end portion (frontward-most edge) 8F of the anvil 8, is 125 mm or less, and maximum tightening torque Tr of the anvil 8 is 230 N·m or more. The impact driver 1 according to the embodiment can obtain a maximum tightening torque Tr higher than that of the above-described known impact drivers while achieving a shortening of axial length Da. Consequently, improved work efficiency and/or ergonomics of the impact driver 1 can be achieved.

Figure 9:
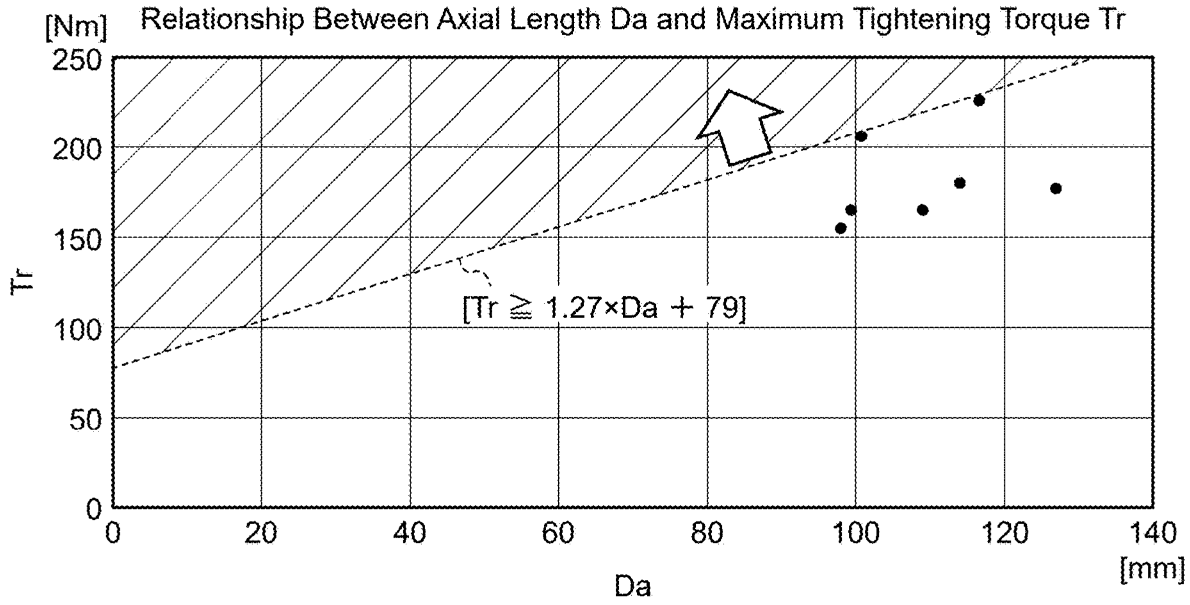
FIG. 9 is a graph that shows the relationship between axial length and maximum tightening torque for the impact driver according to the embodiment.

FIG. 9 is a graph that shows the relationship between axial length Da and maximum tightening torque Tr of the impact driver 1 according to the embodiment. In some circumstances, the larger the axial length Da, the larger maximum tightening torque Tr can be made. With regard to the impact driver 1, the relationship between axial length Da and maximum tightening torque Tr preferably satisfies the condition of Equation (1) below.

$$Tr \geq 1.27 \times Da + 79 \qquad (1)$$

Because the condition of Equation (1) is satisfied in the impact driver 1 according to the embodiment, maximum tightening torque Tr higher than that of the above-described known impact drivers can be obtained while achieving a shortening of axial length Da. Consequently, improved work efficiency and/or ergonomics of the impact driver 1 can be achieved.

Figure 10:
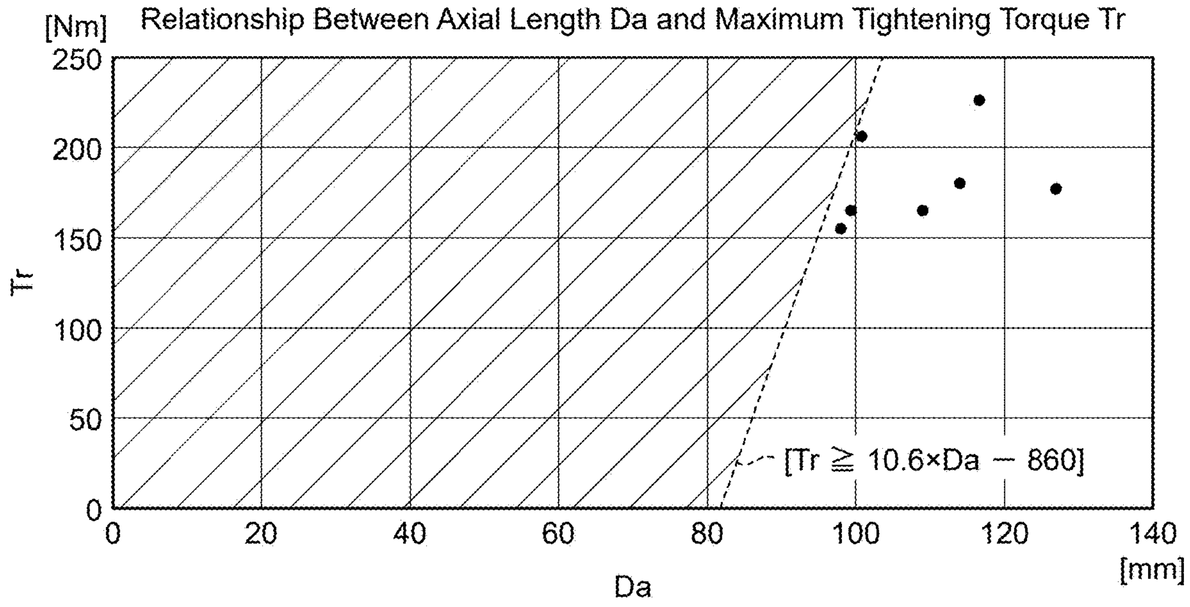
FIG. 10 is a graph that shows the relationship between axial length and maximum tightening torque for the impact driver according to the embodiment.

FIG. 10 is a graph that shows the relationship between axial length Da and maximum tightening torque Tr of the impact driver 1 according to the embodiment. With regard to the impact driver 1, the relationship between axial length Da and maximum tightening torque Tr preferably satisfies the condition of Equation (2) below.

$$Tr \geq 10.6 \times Da - 860 \qquad (2)$$

Therein, in Equation (2), a condition is set in which maximum tightening torque Tr exceeds 0 N·m (Tr≥0).

If the impact driver 1 satisfies the condition of Equation (2) as well, maximum tightening torque Tr higher than that of the above-described known impact drivers can be obtained while achieving a shortening of axial length Da. Consequently, improved work efficiency and/or ergonomics of the impact driver 1 can be achieved.

With regard to the conditions of the impact driver 1 explained with reference to FIGS. 9 and 10, the upper-limit value of axial length Da is preferably approximately 140 mm. With regard to the conditions of the impact driver 1 explained with reference to FIGS. 7-10, the lower-limit value of axial length Da is not particularly limited.

With regard to the conditions of the impact driver 1 explained with reference to FIGS. 9 and 10, axial length Da may be 140 mm or less and 135 mm or more, may be 135 mm or less and 130 mm or more, or may be 130 mm or less and 125 mm or more.

With regard to the conditions of the impact driver 1 explained with reference to FIGS. 8-10, axial length Da may be 125 mm or less and 120 mm or more, may be 120 mm or less and 115 mm or more, may be 115 mm or less and 110 mm or more, may be 110 mm or less and 105 mm or more, may be 105 mm or less and 100 mm or more, or may be 100 mm or less and 95 mm or more.

With regard to the conditions of the impact driver 1 explained with reference to FIGS. 7-10, axial length Da may be 95 mm or less and 90 mm or more, may be 90 mm or less and 85 mm or more, may be 85 mm or less and 80 mm or more, may be 80 mm or less and 75 mm or more, may be 75 mm or less and 70 mm or more, may be 70 mm or less and 65 mm or more, may be 65 mm or less and 60 mm or more, may be 60 mm or less and 55 mm or more, may be 55 mm or less and 50 mm or more, may be 50 mm or less and 45 mm or more, may be 45 mm or less and 40 mm or more, may be 40 mm or less and 35 mm or more, may be 35 mm or less and 30 mm or more, may be 30 mm or less and 25 mm or more, may be 25 mm or less and 20 mm or more, may be 20 mm or less and 15 mm or more, may be 15 mm or less and 10 mm or more, or may be 10 mm or less and 5 mm or more.

As described above, by optimizing the dimensions and the ratios of the structural elements of the impact driver 1, the work efficiency and/or ergonomics of an impact driver 1 can be improved as compared to the above-described known impact drivers. As shown in FIGS. 2-4, examples of dimensions and ratios of the structural elements of the impact driver 1 include: length Db of the anvil 8; length Dc of the hammer 33; length Dd of the spindle 6; length De of the stator core 19; length Df of the fan 10; length Dg of the spindle-rear-portion bearing 32; length Dh of the rotor-rear-portion bearing 24; length Di of the rotor-front-portion bearing 25; the ratio of length Dc of the hammer 33 to diameter Dj of the hammer 33; the ratio of length De of the stator core 19 to diameter Dk of the stator core 19; and the ratio of diameter Dk of the stator core 19 to diameter Dj of the hammer 33.

Length Db of the anvil 8 refers to the distance between a rear-end portion of the anvil 8 and a front-end portion of the anvil 8. Length Db of the anvil 8 may be selected from among 70 mm or less and 65 mm or more, 65 mm or less and 60 mm or more, 60 mm or less and 55 mm or more, 55 mm or less and 50 mm or more, 50 mm or less and 45 mm or more, 45 mm or less and 40 mm or more, 40 mm or less and 35 mm or more, 35 mm or less and 30 mm or more, 30 mm or less and 25 mm or more, 25 mm or less and 20 mm or more, 20 mm or less and 15 mm or more, 15 mm or less and 10 mm or more, and 10 mm or less and 5 mm or more.

Length Dc of the hammer 33 refers to the distance between a rear-end portion (rearward-most edge) of the hammer 33 and a front-end portion (frontward-most edge) of the hammer 33. Length Dc of the hammer 33 may be selected from among 60 mm or less and 55 mm or more, 55 mm or less and 50 mm or more, 50 mm or less and 45 mm or more, 45 mm or less and 40 mm or more, 40 mm or less and 35 mm or more, 35 mm or less and 30 mm or more, 30 mm or less and 25 mm or more, 25 mm or less and 20 mm or more, 20 mm or less and 15 mm or more, 15 mm or less and 10 mm or more, and 10 mm or less and 5 mm or more.

Length Dd of the spindle 6 refers to the distance between a rear-end portion (rearward-most edge) of the spindle 6 and a front-end portion (frontward-most edge) of the spindle 6. Length Dd of the spindle 6 may be selected from among 100 mm or less and 95 mm or more, 95 mm or less and 90 mm or more, 90 mm or less and 85 mm or more, 85 mm or less and 80 mm or more, 80 mm or less and 75 mm or more, 75 mm or less and 70 mm or more, 70 mm or less and 65 mm or more, 65 mm or less and 60 mm or more, 60 mm or less and 55 mm or more, 55 mm or less and 50 mm or more, 50 mm or less and 45 mm or more, 45 mm or less and 40 mm or more, 40 mm or less and 35 mm or more, 35 mm or less and 30 mm or more, 30 mm or less and 25 mm or more, 25 mm or less and 20 mm or more, 20 mm or less and 15 mm or more, 15 mm or less and 10 mm or more, and 10 mm or less and 5 mm or more.

Length De of the stator core 19 refers to the distance between a rear-end portion (rearward-most edge) of the stator core 19 and a front-end portion (frontward-most edge) of the stator core 19. Length De of the stator core 19 may be selected from among 80 mm or less and 75 mm or more, 75 mm or less and 70 mm or more, 70 mm or less and 65 mm or more, 65 mm or less and 60 mm or more, 60 mm or less and 55 mm or more, 55 mm or less and 50 mm or more, 50 mm or less and 45 mm or more, 45 mm or less and 40 mm or more, 40 mm or less and 35 mm or more, 35 mm or less and 30 mm or more, 30 mm or less and 25 mm or more, 25 mm or less and 20 mm or more, 20 mm or less and 15 mm or more, 15 mm or less and 10 mm or more, and 10 mm or less and 5 mm or more.

Length Df of the fan 10 refers to the distance between a rear-end portion (rearward-most edge) of the fan 10 and a front-end portion (frontward-most edge) of the fan 10. Length Df of the fan 10 may be selected from among 30 mm or less and 25 mm or more, 25 mm or less and 20 mm or more, 20 mm or less and 15 mm or more, 15 mm or less and 10 mm or more, 10 mm or less and 5 mm or more, and 5 mm or less and 1 mm or more.

Length Dg of the spindle-rear-portion bearing 32 refers to the distance between a rear-end portion (rearward-most edge) of the spindle-rear-portion bearing 32 and a front-end portion (frontward-most edge) of the spindle-rear-portion bearing 32. Length Dg of the spindle-rear-portion bearing 32 may be selected from among 10 mm or less and 9 mm or more, 9 mm or less and 8 mm or more, 8 mm or less and 7 mm or more, 7 mm or less and 6 mm or more, 6 mm or less and 5 mm or more, 5 mm or less and 4 mm or more, 4 mm or less and 3 mm or more, 3 mm or less and 2 mm or more, and 2 mm or less and 1 mm or more.

Length Dh of the rotor-rear-portion bearing 24 refers to the distance between a rear-end portion (rearward-most edge) of the rotor-rear-portion bearing 24 and a front-end portion (frontward-most edge) of the rotor-rear-portion bearing 24. Length Dh of the rotor-rear-portion bearing 24 may be selected from among 10 mm or less and 9 mm or more, 9 mm or less and 8 mm or more, 8 mm or less and 7 mm or more, 7 mm or less and 6 mm or more, 6 mm or less and 5 mm or more, 5 mm or less and 4 mm or more, 4 mm or less and 3 mm or more, 3 mm or less and 2 mm or more, and 2 mm or less and 1 mm or more.

Length Di of the rotor-front-portion bearing 25 refers to the distance between a rear-end portion (rearward-most edge) of the rotor-front-portion bearing 25 and a front-end portion (frontward-most edge) of the rotor-front-portion bearing 25. Length Di of the rotor-front-portion bearing 25 may be selected from among from among 10 mm or less and 9 mm or more, 9 mm or less and 8 mm or more, 8 mm or less and 7 mm or more, 7 mm or less and 6 mm or more, 6 mm or less and 5 mm or more, 5 mm or less and 4 mm or more, 4 mm or less and 3 mm or more, 3 mm or less and 2 mm or more, and 2 mm or less and 1 mm or more.

The ratio of length Dc of the hammer 33 to diameter Dj of the hammer 33 (Dc:Dj) may be selected from among 1:1.0 or more and 1.1 or less, 1:1.1 or more and 1.2 or less, 1:1.2 or more and 1.3 or less, 1:1.3 or more and 1.4 or less, 1:1.4 or more and 1.5 or less, 1:1.5 or more and 1.6 or less, 1:1.6 or more and 1.7 or less, 1:1.7 or more and 1.8 or less, 1:1.8 or more and 1.9 or less, 1:1.9 or more and 2.0 or less, 1:2.0 or more and 2.1 or less, 1:2.1 or more and 2.2 or less, 1:2.2 or more and 2.3 or less, 1:2.3 or more and 2.4 or less, 1:2.4 or more and 2.5 or less, 1:2.5 or more and 2.6 or less, 1:2.6 or more and 2.7 or less, 1:2.7 or more and 2.8 or less, 1:2.8 or more and 2.9 or less, and 1:2.9 or more and 3.0 or less.

The ratio of length De of the stator core 19 to diameter Dk of the stator core 19 (De:Dk) may be selected from among 1:1.0 or more and 1.1 or less, 1:1.1 or more and 1.2 or less, 1:1.2 or more and 1.3 or less, 1:1.3 or more and 1.4 or less, 1:1.4 or more and 1.5 or less, 1:1.5 or more and 1.6 or less, 1:1.6 or more and 1.7 or less, 1:1.7 or more and 1.8 or less, 1:1.8 or more and 1.9 or less, 1:1.9 or more and 2.0 or less, 1:2.0 or more and 2.1 or less, 1:2.1 or more and 2.2 or less, 1:2.2 or more and 2.3 or less, 1:2.3 or more and 2.4 or less, 1:2.4 or more and 2.5 or less, 1:2.5 or more and 2.6 or less, 1:2.6 or more and 2.7 or less, 1:2.7 or more and 2.8 or less, 1:2.8 or more and 2.9 or less, and 1:2.9 or more and 3.0 or less. In addition, the ratio of length De of the stator core 19 to diameter Dk of the stator core 19 (De:Dk) may be 1:3 or more and 1.10 or less or may be 1:4.9 or more and 5.0 or less.

The ratio of diameter Dk of the stator core 19 to diameter Dj of the hammer 33 (Dk:Dj) may be selected from among 0.6 or more and 0.7 or less:1, 0.7 or more and 0.8 or less:1, 0.8 or more and 0.9 or less:1, 0.9 or more and 1.0 or less:1, 1:1.0 or more and 0.9 or less, 1:0.9 or more and 0.8 or less, 1:0.8 or more and 0.7 or less, and 1:0.7 or more and 0.6 or less.

Maximum tightening torque Tr of the anvil 8 may be selected from among 400 N·m or less and 390 N·m or more, 390 N·m or less and 380 N·m or more, 380 N·m or less and 370 N·m or more, 370 N·m or less and 360 N·m or more, 360 N·m or less and 350 N·m or more, 350 N·m or less and 340 N·m or more, 340 N·m or less and 330 N·m or more, 330 N·m or less and 320 N·m or more, 320 N·m or less and 310 N·m or more, 310 N·m or less and 300 N·m or more, 300 N·m or less and 290 N·m or more, 290 N·m or less and 280 N·m or more, 280 N·m or less and 270 N·m or more, 270 N·m or less and 260 N·m or more, 260 N·m or less and 250 N·m or more, 250 N·m or less and 240 N·m or more, 240 N·m or less and 230 N·m or more, 230 N·m or less and 220 N·m or more, 220 N·m or less and 210 N·m or more, 210 N·m or less and 200 N·m or more, 200 N·m or less and 190 N·m or more, 190 N·m or less and 180 N·m or more, 180 N·m or less and 170 N·m or more, 170 N·m or less and 160 N·m or more, 160 N·m or less and 150 N·m or more, and 150 N·m or less and 140 N·m or more.

The maximum rotational speed of the anvil 8 may be selected from among 4,000 rpm or less and 3,900 rpm or more, 3,900 rpm or less and 3,800 rpm or more, 3,800 rpm or less and 3,700 rpm or more, 3,700 rpm or less and 3,600 rpm or more, 3,600 rpm or less and 3,500 rpm or more, 3,500 rpm or less and 3,400 rpm or more, 3,400 rpm or less and 3,300 rpm or more, 3,300 rpm or less and 3,200 rpm or more, 3,200 rpm or less and 3,100 rpm or more, 3,100 rpm or less and 3,000 rpm or more, 3,000 rpm or less and 2,900 rpm or more, 2,900 rpm or less and 2,800 rpm or more, 2,800 rpm or less and 2,700 rpm or more, 2,700 rpm or less and 2,600 rpm or more, 2,600 rpm or less and 2,500 rpm or more, 2,500 rpm or less and 2,400 rpm or more, 2,400 rpm or less and 2,300 rpm or more, 2,300 rpm or less and 2,200 rpm or more, 2,200 rpm or less and 2,100 rpm or more, 2,100 rpm or less and 2,000 rpm or more, 2,000 rpm or less and 1,900 rpm or more, 1,900 rpm or less and 1,800 rpm or more, 1,800 rpm or less and 1,700 rpm or more, 1,700 rpm or less and 1,600 rpm or more, 1,600 rpm or less and 1,500 rpm or more, 1,500 rpm or less and 1,400 rpm or more, 1,400 rpm or less and 1,300 rpm or more, 1,300 rpm or less and 1,200 rpm or more, 1,200 rpm or less and 1,100 rpm or more, and 1,100 rpm or less and 1,000 rpm or more.

The maximum rotational speed of the motor 4 may be selected from among 50,000 rpm or less and 49,000 rpm or more, 49,000 rpm or less and 48,000 rpm or more, 48,000 rpm or less and 47,000 rpm or more, 47,000 rpm or less and 46,000 rpm or more, 46,000 rpm or less and 45,000 rpm or more, 45,000 rpm or less and 44,000 rpm or more, 44,000 rpm or less and 43,000 rpm or more, 43,000 rpm or less and 42,000 rpm or more, 42,000 rpm or less and 41,000 rpm or more, 41,000 rpm or less and 40,000 rpm or more, 40,000 rpm or less and 39,000 rpm or more, 39,000 rpm or less and 38,000 rpm or more, 38,000 rpm or less and 37,000 rpm or more, 37,000 rpm or less and 36,000 rpm or more, 36,000 rpm or less and 35,000 rpm or more, 35,000 rpm or less and 34,000 rpm or more, 34,000 rpm or less and 33,000 rpm or more, 33,000 rpm or less and 32,000 rpm or more, 32,000 rpm or less and 31,000 rpm or more, 31,000 rpm or less and 30,000 rpm or more, 30,000 rpm or less and 29,000 rpm or more, 29,000 rpm or less and 28,000 rpm or more, 28,000 rpm or less and 27,000 rpm or more, 27,000 rpm or less and 26,000 rpm or more, 26,000 rpm or less and 25,000 rpm or more, 25,000 rpm or less and 24,000 rpm or more, 24,000 rpm or less and 23,000 rpm or more, 23,000 rpm or less and 22,000 rpm or more, 22,000 rpm or less and 21,000 rpm or more, 21,000 rpm or less and 20,000 rpm or more, 20,000 rpm or less and 19,000 rpm or more, 19,000 rpm or less and 18,000 rpm or more, 18,000 rpm or less and 17,000 rpm or more, 17,000 rpm or less and 16,000 rpm or more, 16,000 rpm or less and 15,000 rpm or more, 15,000 rpm or less and 14,000 rpm or more, 14,000 rpm or less and 13,000 rpm or more, 13,000 rpm or less and 12,000 rpm or more, 12,000 rpm or less and 11,000 rpm or more, and 11,000 rpm or less and 10,000 rpm or more.

The total weight of the impact driver 1 may be selected from among 2.5 kg or less and 2.4 kg or more, 2.4 kg or less and 2.3 kg or more, 2.3 kg or less and 2.2 kg or more, 2.2 kg or less and 2.1 kg or more, 2.1 kg or less and 2.0 kg or more, 2.0 kg or less and 1.9 kg or more, 1.9 kg or less and 1.8 kg or more, 1.8 kg or less and 1.7 kg or more, 1.7 kg or less and 1.6 kg or more, 1.6 kg or less and 1.5 kg or more, 1.5 kg or less and 1.4 kg or more, 1.4 kg or less and 1.3 kg or more, 1.3 kg or less and 1.2 kg or more, 1.2 kg or less and 1.1 kg or more, 1.1 kg or less and 1.0 kg or more, 1.0 kg or less and 0.9 kg or more, 0.9 kg or less and 0.8 kg or more, 0.8 kg or less and 0.7 kg or more, 0.7 kg or less and 0.6 kg or more, and 0.6 kg or less and 0.5 kg or more. The total weight of the impact driver 1 refers to the weight of the impact driver 1, including the battery pack 43. It is noted that the weight of the impact driver 1 not including the battery pack 43 may be 2.0 kg or less and 1.9 kg or more or may be 2.0 kg or less and 0.5 kg or more.

As described above, by adjusting the dimensions, the ratios, and the like of the structural elements of the impact driver 1, improved work efficiency and/or ergonomics of the impact driver 1 can be achieved. As one example, the relationship between length Dc of the hammer 33 and length De of the stator core 19 will be explained below.

Figure 11:
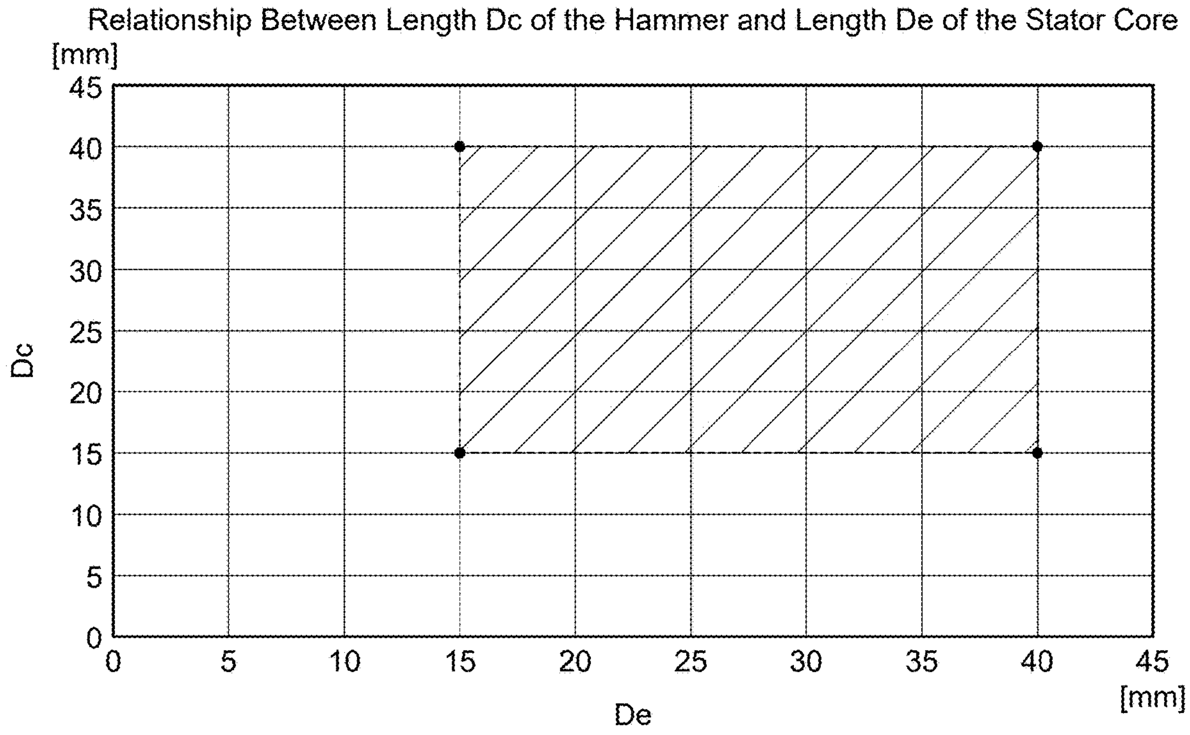
FIG. 11 is a graph that shows the relationship between the length of the hammer and the length of a stator core according to the embodiment.

FIG. 11 is a graph that shows the relationship between length Dc of the hammer 33 and length De of the stator core 19 according to the embodiment. As shown in FIG. 11, when the length of the hammer 33 is given as Dc and the length of the stator core 19 is given as De, length Dc of hammer 33 and length De of stator core 19 may satisfy the conditions indicated in Equation (3) and Equation (4) below.

$$15\text{ mm} \le Dc \le 40\text{ mm} \quad (3)$$

$$1\text{ mm} \le De \le 40\text{ mm} \quad (4)$$

After length Dc of the hammer 33 and length De of the stator core 19 have been determined, the dimensions, the ratios, and the like of the structural elements other than the hammer 33 and the stator core 19 are optimized such that: axial length Da becomes 97 mm or less; axial length Da becomes 125 mm or less and maximum tightening torque Tr of the anvil 8 becomes 230 N·m or more; the condition of Equation (1) is satisfied; and the condition of Equation (2) is satisfied.

Figure 12:
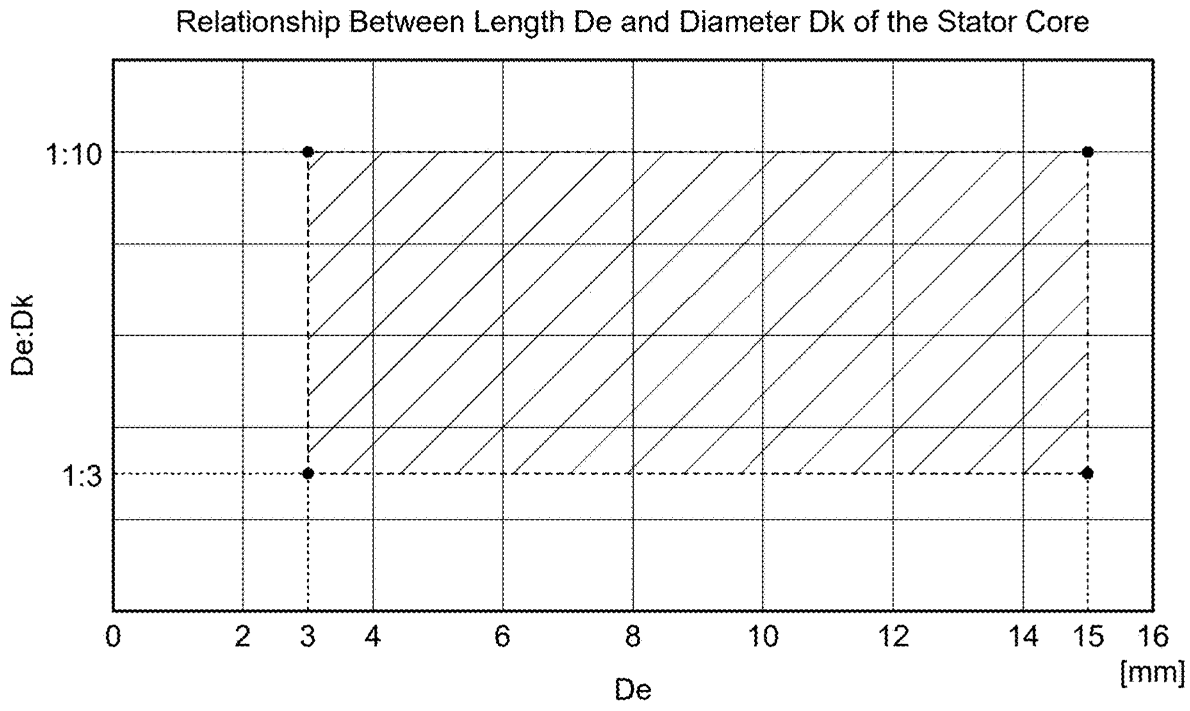
FIG. 12 is a graph that shows the relationship between length De of the stator core and the ratio (De:Dk) of length De of the stator core to diameter Dk of the stator core according to the embodiment.

FIG. 12 is a graph that shows the relationship between length De of the stator core 19 and the ratio of length De of the stator core 19 to diameter Dk of the stator core 19 (De:Dk) according to the embodiment. As shown in FIG. 12, the conditions that length De is 3 mm or more and 15 mm or less and the ratio (De:Dk) is 1:3 or more and 10 or less may be satisfied.

Figure 13:
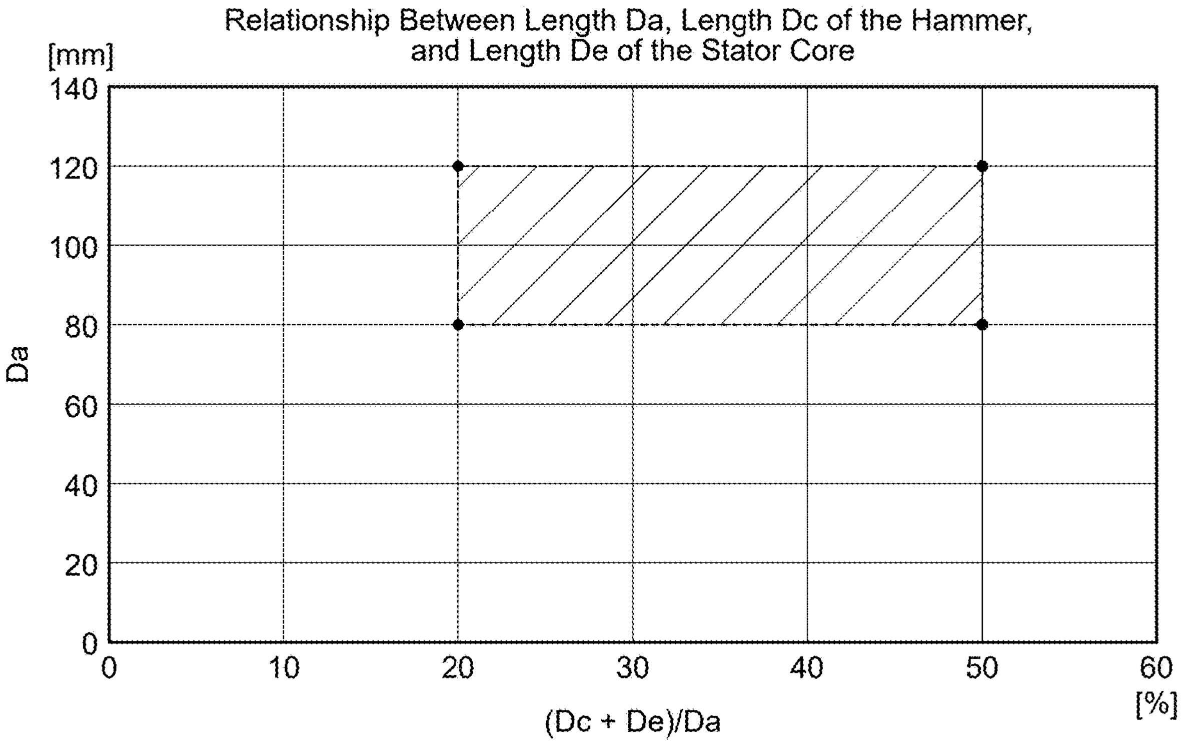
FIG. 13 is a graph that shows the relationship between the sum of length Dc and length De as a fraction of axial length Da [(Dc+De)/Da] and axial length Da according to the embodiment.

FIG. 13 is a graph that shows the relationship between the sum of length Dc and length De as a fraction of axial length Da [(Dc+De)/Da] and axial length Da according to the embodiment. As shown in FIG. 13, the conditions that [(Dc+De)/Da] is 20% or more and 60% or less and axial length Da is 80 mm or more and 120 mm or less may be satisfied.

Figure 14:
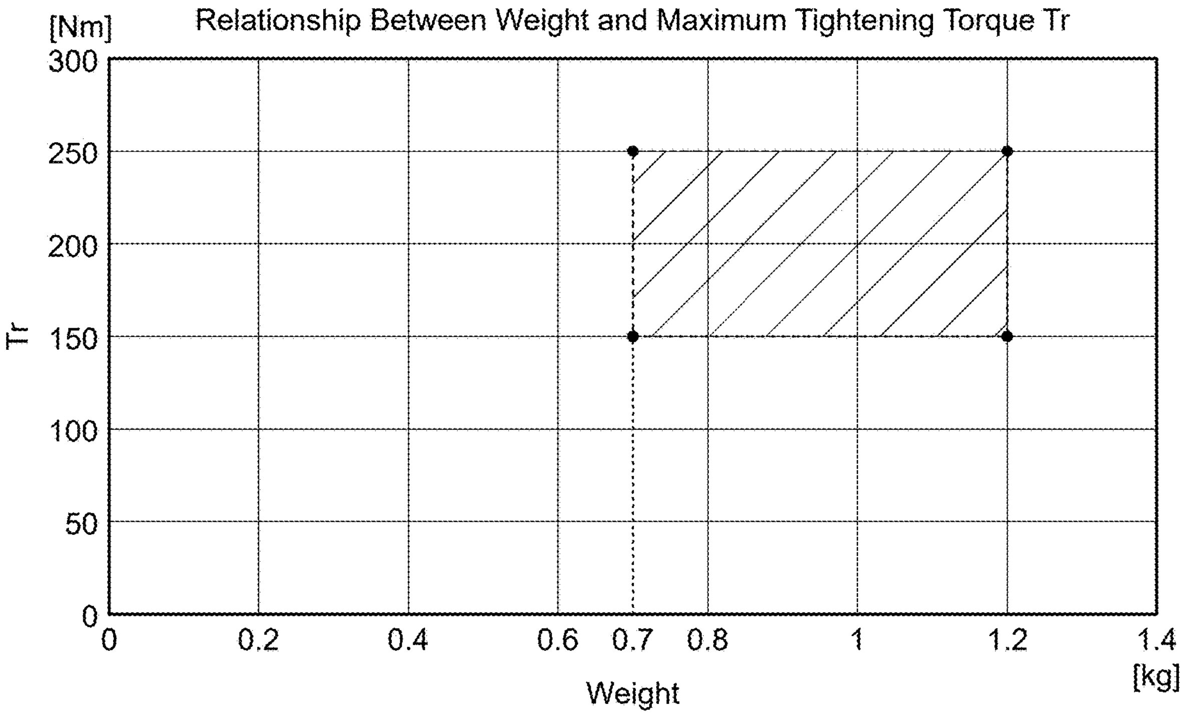
FIG. 14 is a graph that shows the relationship between weight and maximum tightening torque for the impact driver according to the embodiment.

FIG. 14 is a graph that shows the relationship between the weight of the impact driver 1 and maximum tightening torque Tr according to the embodiment. In FIG. 14, the weight of the impact driver 1 does not include the weight of the battery pack 43. As shown in FIG. 14, the conditions that the weight of the impact driver 1 is 0.7 kg or more and 1.4 kg or less and maximum tightening torque Tr is 150 N·m or more and 250 N·m or less may be satisfied.

Effects

In the embodiment as explained above, the impact driver 1 comprises the motor 4, the spindle 6, the hammer 33, and the anvil 8. The spindle 6 is disposed forward of the motor 4. The spindle 6 is rotated by the motor 4. The hammer 33 is supported by (on, around) the spindle 6. The anvil 8 is impacted in the rotational direction by the hammer 33. In addition, the impact driver 1 comprises the motor housing 14, which houses the motor 4. The impact driver 1 comprises the grip housing 15, which extends downward from the motor housing 14. The impact driver 1 comprises the battery-holding housing 16, which is disposed at a lower-end portion of the grip housing 15. The battery-holding housing 16 holds the battery pack 43. The rated voltage of the battery pack 43 is 18 V.

In the embodiment, axial length Da, which is defined as the distance between the rear-end portion (rearward-most edge) 14R of the motor housing 14 and the front-end portion (frontward-most edge) 8F of the anvil 8, is 97 mm or less.

According to the above-mentioned configuration, because axial length Da, which is defined as the distance between the rear-end portion (rearward-most edge) 14R of the motor housing 14 and the front-end portion (frontward-most edge) 8F of the anvil 8, is 97 mm or less, a shortening of axial length Da is achieved. Consequently, the work efficiency and/or ergonomics of an impact driver can be improved.

In the embodiment, the distance between the rear-end portion (rearward-most edge) 14R of the motor housing 14 and the front-end portion (frontward-most edge) 8F of the anvil 8 is 125 mm or less. The maximum tightening torque of the anvil 8 is 230 N·m or more.

According to the above-mentioned configuration, because axial length Da, which is defined as the distance between the rear-end portion 14R of the motor housing 14 and the front-end portion 8F of the anvil 8, is 125 mm or less and maximum tightening torque Tr of anvil 8 is 230 N·m or more, the combination of a shortening of axial length Da and an increase in maximum tightening torque Tr is achieved. Consequently, the work efficiency and/or ergonomics of an impact driver can be improved.

In the embodiment, when the axial length, which is defined as the distance between the rear-end portion (rear-ward-most edge) 14R of the motor housing 14 and the front-end portion (frontward-most edge) 8F of the anvil 8, is given as Da and the maximum tightening torque of the anvil 8 is given as Tr, the following condition is satisfied:

$$Tr \geq 1.27 \times Da + 79.$$

According to the above-mentioned configuration, the combination of a shortening of axial length Da and an increase in maximum tightening torque Tr is achieved.

Consequently, the work efficiency and/or ergonomics of an impact driver can be improved.

In the embodiment, when the distance between the rear-end portion 14R of the motor housing 14 and the front-end portion 8F of the anvil 8 is given as Da and the maximum tightening torque of the anvil 8 is given as Tr, the following conditions are satisfied:

$$Tr \geq 10.6 \times Da - 860; \text{ and}$$

$$Tr \geq 0.$$

According to the above-mentioned configuration, the combination of a shortening of axial length Da and an increase in maximum tightening torque Tr is achieved. Consequently, the work efficiency and/or ergonomics of an impact driver can be improved.

In the embodiment, the motor 4 comprises the rotor 18, which is coupled to the spindle 6 and rotates about rotational axis AX, and the stator 17, which is disposed around the rotor 18. The stator 17 comprises the stator core 19 and the coils 20, which are respectively mounted on the teeth 191 of the stator core 19. When the length of the hammer 33 is given as Dc and the length of the stator core 19 is given as De, the following conditions are satisfied:

$$15\text{ mm} \leq Dc \leq 40\text{ mm; and}$$

$$15\text{ mm} \leq De \leq 40\text{ mm}.$$

According to the above-mentioned configuration, the impact driver 1 is provided in which the balance between length Dc of the hammer 33 and length De of the stator core 19 is improved, and thereby the work efficiency and/or ergonomics of an impact driver can be improved.

In the embodiment, the motor 4 comprises the rotor 18, which is coupled to the spindle 6 and rotates about rotational axis AX, and the stator 17, which is disposed around the rotor 18. The stator 17 comprises the stator core 19 and the coils 20, which are mounted on the teeth 191 of the stator core 19. When the length of the stator core 19 is given as De and the diameter of the stator core 19 is given as Dk, the following conditions are satisfied:

length De is 3 mm or more and 15 mm or less; and the ratio (De:Dk) is 1:3 or more and 10 or less.

According to the above-mentioned configuration, the impact driver 1 is provided in which the balance between length De of the stator core 19 and diameter Dk of the stator core 19 is improved, and thereby the work efficiency and/or ergonomics of an impact driver can be improved.

In the embodiment, the motor 4 comprises the rotor 18, which is coupled to the spindle 6 and rotates about rotational axis AX, and the stator 17, which is disposed around the rotor 18. The stator 17 comprises the stator core 19 and the coils 20, which are mounted respectively on the teeth 191 of the stator core 19. When the axial length, which is defined as the distance between the rear-end portion (rearward-most edge) 14R of the motor housing 14 and the front-end portion (frontward-most edge) 8F of the anvil 8, is given as Da, the length of the hammer 33 is given as Dc, and the length of the stator core 19 is given as De, the following conditions are satisfied:

(Dc+De)/Da is 20% or more and 60% or less; and axial length Da is 80 mm or more and 120 mm or less.

According to the above-mentioned configuration, the impact driver 1 is provided in which the balance among axial length Da, length Dc of the hammer 33, and length De of the stator core 19 is improved, and thereby the work efficiency and/or ergonomics of an impact driver can be improved.

In the embodiment, the weight of the impact driver 1 is preferably 0.7 kg or more and 1.4 kg or less and maximum tightening torque Tr of the anvil 8 is preferably 150 N·m or more and 250 N·m or less.

According to the above-mentioned configuration, a light-weight impact driver 1 having a relatively large maximum tightening torque Tr is provided.

Representative, non-limiting examples of the present invention were described above in detail with reference to the attached drawings. This detailed description is merely intended to teach a person of skill in the art further details for practicing preferred aspects of the present teachings and is not intended to limit the scope of the invention. Furthermore, each of the additional features and teachings disclosed above may be utilized separately or in conjunction with other features and teachings to provide improved impact drivers.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

EXPLANATION OF THE REFERENCE NUMBERS

1 Impact driver (Impact tool)
2 Housing
3 Hammer case
4 Motor
5 Speed-reducing mechanism
6 Spindle
7 Impact mechanism
8 Anvil
8F Front-end portion
9 Tool-holding mechanism
10 Fan
11 Battery-mounting part
12 Trigger lever
13 Forward/reverse change lever
14 Motor housing
14A Tubular part
14B Rear-cover part
14R Rear-end portion
15 Grip housing
16 Battery-holding housing
17 Stator
18 Rotor
19 Stator core
20 Coil
21 Rotor core
21A Through hole
22 Rotor magnet
23 Rotor shaft
24 Rotor-rear-portion bearing
25 Rotor-front-portion bearing
26 Pinion gear
27 Planet gear
28 Internal gear
29 Pin
30 Flange part
31 Spindle-shaft part
32 Spindle-rear-portion bearing
33 Hammer
34 Ball
35 Coil spring
36 Spindle groove
37 Hammer groove
38 Recessed portion
39 Tool hole
40 Anvil-projection part
41 Anvil-shaft part
42 Hammer-projection part
43 Battery pack
43A Secondary battery
44 Bearing-retaining member
45 Anvil bearing
46 Air-intake port
47 Air-exhaust port
50 Controller
50A Controller case
51 Operation panel
52 Light assembly
52A Light-emitting device
52B Circuit board
191 Tooth
192 Slot
AX Rotational axis

The invention claimed is:

1. An impact tool comprising:
a motor;
a spindle disposed forward of the motor and configured to be rotated by the motor;
a hammer supported by the spindle;
an anvil configured to be impacted in a rotational direction by the hammer;
a motor housing, which houses the motor;
a grip housing, which extends downward from the motor housing; and
a battery-holding housing disposed at a lower-end portion of the grip housing and configured to hold a battery pack;
wherein, when the distance between a rearward-most edge of the motor housing and a frontward-most edge of the anvil is given as Da in millimeters and the maximum tightening torque of the anvil is given as Tr expressed as N·m, the following condition is satisfied:

$$Tr \geq 1.27 \times Da + 79.$$

2. The impact tool according to claim 1, wherein:
the motor comprises a rotor operably coupled to the spindle and configured to rotate about a rotational axis, and a stator disposed around the rotor;
the stator comprises a stator core and coils, which are respectively wound around teeth of the stator core;

the length of the hammer is given as Dc in millimeters and the length of the stator core is given as De in millimeters; and the following conditions are satisfied:

$$15\ \text{mm} \le Dc \le 40\ \text{mm}; \text{ and}$$

$$15\ \text{mm} \le De \le 40\ \text{mm}.$$

3. The impact tool according to claim 1, wherein:

the motor comprises a rotor operably coupled to the spindle and configured to rotate about a rotational axis, and a stator disposed around the rotor;

the stator comprises a stator core and coils, which are respectively wound around teeth of the stator core;

the length of the stator core is given as De in millimeters and the diameter of the stator core is given as Dk in millimeters; and the following conditions are satisfied:

De is 3 mm or more and 15 mm or less; and the ratio (De:Dk) is 1:3 or more and 1:10 or less.

4. The impact tool according to claim 1, wherein:

the motor comprises a rotor operably coupled to the spindle and configured to rotate about a rotational axis, and a stator disposed around the rotor;

the stator comprises a stator core and coils, which are respectively wound around teeth of the stator core;

the distance between the rearward-most edge of the motor housing and the frontward-most edge of the anvil is given as Da in millimeters, the length of the hammer is given as Dc in millimeters, and the length of the stator core is given as De in millimeters; and the following conditions are satisfied:

(Dc+De)/Da is 20% or more and 60% or less; and

Da is 80 mm or more and 120 mm or less.

5. The impact tool according to claim 1, wherein the weight of the impact tool is 0.7 kg or more and 1.4 kg or less.

6. The impact tool according to claim 1, wherein:

the distance between the rearward-most edge of the motor housing and the frontward-most edge of the anvil is given as Da in millimeters and the maximum tightening torque of the anvil is given as Tr expressed as N·m; and the following conditions are satisfied:

$$Tr \ge 10.6 \times Da - 860; \text{ and}$$

$$Tr \ge 0.$$

7. The impact tool according to claim 1, wherein:

the motor comprises a rotor operably coupled to the spindle and configured to rotate about a rotational axis, and a stator disposed around the rotor;

the stator comprises a stator core and coils, which are respectively wound around teeth of the stator core;

the length of the hammer is given as Dc in millimeters and the length of the stator core is given as De in millimeters; and the following conditions are satisfied:

$$15\ \text{mm} \le Dc \le 40\ \text{mm}; \text{ and}$$

$$3\ \text{mm} \le De \le 15\ \text{mm}.$$

8. The impact tool according to claim 7, wherein:

the diameter of the stator core is given as Dk in millimeters; and the following conditions are satisfied:

De is 5 mm or more and 15 mm or less; and the ratio (De:Dk) is 1:3 or more and 1:10 or less.

9. The impact tool according to claim 8, wherein:

the length of the hammer is given as Dc in millimeters, and (Dc+De)/Da is 20% or more and 60% or less.

10. The impact tool according to claim 9, wherein the distance between a rearward-most edge of the motor housing and a frontward-most edge of the anvil is 120-125 mm.

11. The impact tool according to claim 9, wherein the weight of the impact tool is 0.7 kg or more and 1.4 kg or less.

12. The impact tool according to claim 11, wherein the maximum tightening torque of the anvil is 150 N·m or more and 250 N·m or less.

13. The impact tool according to claim 12, further comprising:

a battery pack attached to the battery-holding housing;

wherein the total weight of the impact tool with the attached battery pack is 1.0 kg or more and 2.5 kg or less.

14. The impact tool according to claim 13, wherein the battery pack has a rated voltage of 18 V.

15. The impact tool according to claim 8, wherein the maximum tightening torque of the anvil is 230 N·m or more.

16. The impact tool according to claim 15, further comprising:

a battery pack attached to the battery-holding housing;

wherein the total weight of the impact tool with the attached battery pack is 1.0 kg or more and 2.5 kg or less.

17. The impact tool according to claim 16, wherein the battery pack has a rated voltage of 18 V.

18. The impact tool according to claim 1, further comprising:

a battery pack attached to the battery-holding housing;

wherein the total weight of the impact tool with the attached battery pack is 1.0 kg or more and 2.5 kg or less.

19. The impact tool according to claim 8, further comprising:

a battery pack attached to the battery-holding housing;

wherein the battery pack has a rated voltage of 18 V.

* * * * *